(12) United States Patent
Christmas et al.

(10) Patent No.: US 11,846,775 B2
(45) Date of Patent: Dec. 19, 2023

(54) HEAD-UP DISPLAY

(71) Applicant: Envisics Ltd, Milton Keynes (GB)

(72) Inventors: Jamieson Christmas, Milton Keynes (GB); Michael Spurr, Milton Keynes (GB); Daniel Molina, Milton Keynes (GB); Gary Mills, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 97 days.

(21) Appl. No.: 17/334,009

(22) Filed: May 28, 2021

(65) Prior Publication Data

US 2022/0283433 A1    Sep. 8, 2022

(30) Foreign Application Priority Data

Mar. 5, 2021 (GB) ..................... 2103148

(51) Int. Cl.
*G02B 27/01* (2006.01)
*G02B 13/00* (2006.01)
*G02B 27/00* (2006.01)

(52) U.S. Cl.
CPC ..... *G02B 27/0101* (2013.01); *G02B 13/0095* (2013.01); *G02B 27/0081* (2013.01)

(58) Field of Classification Search
CPC ..... G02B 2027/0105–0198; G02B 27/00–648; G02B 13/00–26
See application file for complete search history.

(56) References Cited

U.S. PATENT DOCUMENTS

| | | | |
|---|---|---|---|
| 2008/0094586 A1 | 4/2008 | Tirayama | |
| 2009/0231719 A1* | 9/2009 | Powell | G02B 27/0961 359/630 |
| 2011/0134498 A1 | 6/2011 | Ohta | |
| 2013/0050655 A1 | 2/2013 | Fujikawa et al. | |
| 2013/0050834 A1 | 2/2013 | Fujikawa | |
| 2019/0250406 A1 | 8/2019 | Nakamura et al. | |
| 2019/0378944 A1 | 12/2019 | Zhang | |

FOREIGN PATENT DOCUMENTS

| | | |
|---|---|---|
| CN | 107703627 A | 2/2018 |
| JP | 2006015941 A | 1/2006 |
| JP | 2013-064985 A | 4/2013 |
| WO | 2021/040990 A1 | 3/2021 |

OTHER PUBLICATIONS

Notice of Reasons of Refusal, Patent Application No. JP2022021810A, dated Sep. 26, 2023.

\* cited by examiner

*Primary Examiner* — Bao-Luan Q Le
*Assistant Examiner* — Christopher A Lamb, II
(74) *Attorney, Agent, or Firm* — McDonnell Boehnen Hulbert & Berghoff LLP

(57) ABSTRACT

A head-up display arranged to form a virtual image viewable from an eye-box area. The head-up display is arranged to received picture content within a sub-region of a substantially quadrilateral display area. The head-up display further comprises an optical relay system arranged to relay the received picture content to an eye-box of the head-up display such that a virtual image of the picture content is visible therefrom. The optical relay system comprises at least one optical component shaped in correspondence with the shape of the sub-region. The shape of the eye-box area is non-rectangular such as a corner-cropped rectangular shape or elliptical shape.

18 Claims, 23 Drawing Sheets

| CONFIG. | DISTORTION (%) | | VERTICAL DISPARITY (mrad) | | HORIZONTAL DISPARITY (mrad) | |
| --- | --- | --- | --- | --- | --- | --- |
| | Average | Max | Average | Max | Average | Max |
| Improvement over A achieved by B | (-13%) | (-11%) | (-9%) | (-21%) | (-10%) | (-14%) |
| Improvement over A achieved by C | (-32%) | (-20%) | (-4%) | (-30%) | (-19%) | (-22%) |

FIGURE 11

HEAD-UP DISPLAY

CROSS-REFERENCE TO RELATED APPLICATIONS

The present application is a non-provisional patent application claiming priority to United Kingdom Patent Application No. 2103148.9, filed Mar. 5, 2021, the contents of which are hereby incorporated by reference in their entirety.

FIELD OF THE DISCLOSURE

The present disclosure relates to a projector and a head-up display. More specifically, the present disclosure relates to a holographic projector and a head-up display for a vehicle such as an automotive vehicle. The present disclosure also relates to a method of holographic projection, a method of projecting a virtual image in a head-up display and a method of displaying a virtual image on a window such as a windscreen using a head-up display.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example. Conventionally, a rectangular area (referred to herein as a virtual image area) is defined in the driver's field of view and the head-up display may display image content in this rectangular area.

SUMMARY

Aspects of the present disclosure are defined in the appended independent claims.

There is disclosed herein an improved HUD for an automotive vehicle. The HUD includes a picture generating unit. The picture generating unit may be arranged to generate a picture including information content, such as speed or navigation information. There is also provided an optical relay or projection system arranged to form a virtual image of the information content. The virtual image of the information content may be formed at a suitable viewing position for the driver such as within the driver's normal field of view whilst operating the automotive vehicle. For example, the virtual image of the information content may appear at a distance down the bonnet (or hood) of the vehicle from the driver. The virtual image of the information content is positioned so as not to adversely affect the driver's normal view of the scene. The virtual image of the information content may be overlaid on the driver's view of the real world. The information content is computer-generated and may be controlled or updated in real-time to provide real-time information to the driver.

Embodiments relate to a picture generating unit comprises a holographic projector by way of example only. The present disclosure is compatible with any display technology. In embodiments relating to a holographic projector, the picture is a holographic reconstruction of a computer-generated hologram. The picture may be formed on or projected onto a light receiving surface which acts as a display surface. A HUD based on the holographic projector described in full below is able to deliver a much greater contrast ratio than currently available competing technologies because of the efficiency of the holographic process and its inherent suitability for use with a laser light source.

The head-up display may comprise a holographic processor. The picture may be a holographic reconstruction. The holographic processor may be arranged to output the computer-generated hologram to a spatial light modulator. The computer-generated hologram may be arranged to at least partially compensate for the shape of the windscreen of the vehicle.

The system may be arranged to form the virtual image of the picture using the windscreen by reflecting spatially-modulated light off the windscreen. The light source may be a laser and/or the light of the picture may be laser light. The spatial light modulator may be a liquid crystal on silicon spatial light modulator. The picture may be formed by an interference process of the spatially-modulated light at the light receiving surface. Each computer-generated hologram may be a mathematical transformation of a picture, optionally, a Fourier or Fresnel transformation. The computer-generated hologram may be a Fourier or Fresnel hologram. The computer-generated hologram may be a hologram computer-generated by a point cloud method. The spatial light modulator may be arranged to spatially-modulate the phase of the light from the light source. The spatial light modulator may be arranged to spatially-modulate the amplitude of the light from the light source.

However, some embodiments describe a picture generating unit based on holographic projection by way of example only. Again, the present disclosure is equally applicable to any type of picture generating unit including a backlit liquid crystal display, a laser scanning display, a digital micro-mirror device "DMD", a fluorescent display and a plasma display.

There is provided a head-up display for a vehicle having a window. The head-up display comprises a picture generating unit and a projection engine. The picture generating unit is arranged to output pictures. The projection engine (or optical system) is arranged to receive the pictures output by the picture generating unit and project the pictures onto the window of the vehicle in order to form a virtual image of each picture within a (common) virtual image area. The picture generating unit is arranged to output pictures within a cropped picture area such that the virtual image area has a corresponding cropped shape.

It may be said that the virtual image area (or region or space) is a field of view. The picture generating unit, projection optics and eye-box of the system collectively define the size, shape and position of the virtual image area in accordance with optical design. It may be said that the virtual image area is projected down onto the road to form a light footprint on the road. If the picture area is fully illuminated, the virtual image area will be fully illuminated. That is, if the full area of the picture area is illuminated, the full area of the virtual image area will be illuminated. However, image content (e.g. a navigation arrow) may be displayed in a sub-region of the picture area in which case the projected virtual image will only appear in a corresponding sub-region of the virtual image area.

There is provided a head-up display for a vehicle having a window. The head-up display comprises a picture generating unit and a projection engine. The picture generating unit is arranged to output a picture. The projection engine is arranged to receive the picture output by the picture generating unit and project the picture onto the window of the vehicle in order to form a virtual image of the picture within a virtual image area. The picture generating unit is arranged to output the picture within a picture area having a cropped shape such that the virtual image area has a corresponding cropped shape.

There is provided a head-up display for a vehicle having a window, the head-up display comprises a picture generating unit and a projection engine. The picture generating unit is arranged to generate pictures. The projection engine is arranged to project the pictures onto the window in order to form a virtual image of each picture in the window, wherein the virtual images are formed within a common virtual image area having a cropped shape.

Conventionally, the virtual image area is rectangular. The inventor has questioned the assumption that the virtual image area should be rectangular and recognised that the limitations this places on the overall head-up display system are not justified and are, in fact, obstructive to development of the next generation of augmented reality head-up displays in vehicles. Notably, the inventor has recognised the value in cropping the virtual image area as set out in the present disclosure. The areas of the virtual image area which have been cropped out are not especially useful for displaying image content in a head-up display of a vehicle. In particular, one or two triangular portions of the lower region of the virtual image area are largely redundant because they are too close to the driver given the typical speeds at which the vehicle may be expected to travel. The advantages of removing these two triangular portions, in terms of the optical and space demands of the picture generating unit and projection engine, outweigh the disadvantage in terms of the inability to display image content in these areas. The inventor has challenged the fundamental assumptions of head-up display design and provided a head-up display which represents a significant break from convention as can understood by appreciating the prejudice in the field.

The picture generating unit may be arranged to only generate pictures within the cropped shape of the picture area. It may be said the picture area (e.g. holographic replay field) has been restricted. More specifically, the spatial extent of the picture area (e.g. holographic replay field) is restricted. Alternatively, or additionally, the picture generating unit further comprises a physical mask arranged to block light of the picture outside the cropped shape of the picture.

A primary purpose of the projection engine is to magnify the picture and relay it to the virtual image area. The projection engine may therefore be a magnification engine or magnification optic/s. There is substantially a one-to-one correlation between the picture and the virtual image. An aim is to shape the virtual image area and this may be conveniently achieved by driving the picture generating unit to only provide image content within the cropped shape. Therefore, it is possible to provide the head-up display in accordance with the present disclosure using a conventional system by simply changing the shape of the used picture area. That is, only software modifications are required.

Benefits of the head-up display in accordance with the present disclosure may be felt by arranging the projection engine to only project light of the picture within the cropped shape of the picture area. For example, the projection engine comprises at least one optical element (or optical component) having a shape cropped in accordance with the cropped shape of the picture area and/or virtual image area.

There is provided a method of reducing the volume of a head-up display. The head-up display comprises a picture generating unit, optical system and optical combiner. The picture generating unit is arranged to display picture content within a display area on a screen, wherein the display area has a quadrilateral shape. The optical system is arranged to direct light from the display area to an optical combiner. The optical combiner is arranged to reflect the light from the display area to an eye-box thereby forming a virtual image of the picture content. The method comprises restricting picture content to a sub-area of the display area. The method further comprises mapping the sub-area onto an optical component of the optical system to identify an active area of the component. The method yet further comprises shaping the component in correspondence with the active area to reduce the inactive area of the component.

There is provided a method of reducing the volume of a head-up display. The head-up display comprises a picture generating unit, optical system and optical combiner. The picture generating unit is arranged to display picture content within a quadrilateral area on a screen. The optical system is arranged to direct light from the quadrilateral area to an optical combiner. The optical combiner is arranged to reflect the light from the quadrilateral area to an eye-box thereby forming a virtual image of the picture content. The method comprises restricting picture content to a sub-area of the quadrilateral area. The method further comprises mapping the sub-area onto an optical component of the optical system to identify an active area of the component. The method yet further comprises shaping the component in correspondence with the active area to reduce the inactive area of the component.

There is also provided a head-up display system comprising a picture generating unit, an optical system and an optical combiner. The picture generating unit is arranged to display picture content within a sub-area on a screen, wherein the sub-area has a shape comprising at least five sides. The optical system is arranged to relay light from the sub-area. The optical combiner is arranged to receive the relayed light from the optical system and reflect the light to an eye-box thereby forming a virtual image of the picture content. At least one optical component of the optical system has a shape corresponding to the shape of the sub-area.

There is a head-up display arranged to form virtual images viewable from an eye-box area. The head-up display comprises a picture generating unit comprising a regular array of pixels arranged to form a substantially quadrilateral display area. The head-up display further comprises a display controller arranged to display picture content of the picture generating unit to a sub-area of the display area. in some embodiments, the display controller is arranged to restrict picture content of the picture generating unit to a sub-area of the display area. The display controller may be part of the picture generating unit. The head-up display further comprises an optical relay system arranged to relay light from the sub-area of the display area to an eye-box of the head-up display such that a virtual image of picture content within the sub-area is visible therefrom. The optical relay system comprises at least one optical component shaped in correspondence with the shape of the sub-area. The shape of the eye-box area is non-rectangular.

There is also disclosed herein a head-up display arranged to form a virtual image viewable from an eye-box area. The head-up display is arranged to receive picture content restricted to a sub-area of a substantially quadrilateral display area. The head-up display further comprises an optical relay system arranged to relay the received picture content to an eye-box of the head-up display such that a virtual image of the picture content is visible therefrom. The optical relay system comprises at least one optical component shaped in correspondence with the shape of the sub-area. The shape of the eye-box area is non-rectangular.

According to a first aspect of the present disclosure, there is a head-up display arranged to form virtual images viewable from an eye-box area. The head-up display comprises a picture generating unit comprising a regular array of pixels arranged to form a substantially quadrilateral display area. The head-up display further comprises a display controller arranged to display picture content of the picture generating unit to a sub-region of the display area. The terms "sub-region" and "sub-area" are used interchangeably herein. In some embodiments, the display controller is arranged to restrict picture content of the picture generating unit to a sub-region of the display area. The display controller may be part of the picture generating unit. The head-up display further comprises an optical relay system arranged to relay light from the sub-region of the display area to an eye-box of the head-up display such that a virtual image of picture content within the sub-region is visible therefrom. The optical relay system comprises at least one optical component shaped in correspondence with the shape of the sub-region. The shape of the eye-box area is non-rectangular.

More generally, there is disclosed herein a head-up display arranged to form a virtual image viewable from an eye-box area. The head-up display is arranged to received picture content within a sub-region (e.g. restricted to a sub-region) of a substantially quadrilateral display area. The head-up display further comprises an optical relay system arranged to relay the received picture content to an eye-box of the head-up display such that a virtual image of the picture content is visible therefrom. The optical relay system comprises at least one optical component shaped in correspondence with the shape of the sub-region. The shape of the eye-box area is non-rectangular.

Two significant advantages are achieved. Firstly, the physical size of the head-up display is reduced. Head-up displays are conventionally housed within the dashboard of the vehicle. Head-up displays are relatively large compared to other advanced systems in a vehicle because a large mirror and large optical throw are needed to achieve the necessary magnification. Real-estate within the cabin space—particularly within the dashboard volume—is highly valuable in modern vehicles containing many complex electronic systems and head-up displays are quite expensive in terms of real-estate. It is found that truncating or cropping at least one or two corners of the virtual image area delivers significant spacing saving because the at least one optical element of the projection engine may be correspondingly cropped. Secondly, as with any optical component, the performance of the optical component declines with distance from the optical axis. In particular, aberrations increase with distance from the optical axis. The outer most parts of the at least one optical element of the projection engine therefore have the most detrimental effect on image quality. The overall image quality is therefore improved by decreasing the size of the light footprint on the at least one optical element of the projection engine as described herein.

The cropped virtual image in accordance with the present disclosure may be a far field virtual image. The far field virtual image may convey navigation information. The head-up display may also be arranged to form a near field virtual image. The near field virtual image may convey speed information, for example.

The sub-area may have a shape comprising at least five sides. The shape may have six or eight sides. The shape may be irregular. At least one of the sides of the shape may be curved.

Mapping the sub-area onto an optical component of the optical system may comprise tracing rays of light which form the image from the sub-area of the screen to the optical component to identify a light footprint on the optical component corresponding to the active area. Shaping the component may comprise reducing the physical size of the component.

The head-up display may be housed in a vehicle. The optical combiner may be the windscreen of a vehicle housing the head-up display. The virtual image may overlay an area of the ground in front of the vehicle.

The step of restricting the picture content may comprise excluding a region of the quadrilateral display area which would otherwise form a virtual image overlaying an area closest to the vehicle and/or to one side of the quadrilateral display area. The method may further comprise reducing the physical size of the screen in correspondence with the sub-area. The picture generating unit may comprise a holographic projector. The sub-area may be a sub-area of the holographic replay field. The optical system may have optical power.

The at least one optical element (or component) may be reflective. This approach provides a compact system because a reflective optical element can be used to fold the optical path. The at least one optical element may be a mirror. The at least one optical element may have optical power such that each virtual image is a magnified image of the corresponding picture and/or the virtual image area is a magnified image of the picture area. The angle subtended by the virtual image area (from the eye-box area) may be 5 to 15 degrees, such as 10+/−2 degrees, at the widest point and 2 to 5 degrees, such as 3.5+/−0.5 degrees at the highest point. The picture area may be 20 to 120 mm, such as 55+/−15 mm, at the widest point and 10 to 50 mm, such as 25+/−10 mm, at the highest point. The at least one optical element may have a freeform optical surface configured to optically-compensate for the shape of the window such that the virtual image is not distorted by the window. The at least one optical element may therefore be multi-purpose which is good for keeping the component count down and reducing optical losses.

The cropped shape of the virtual image area may be formed from a rectangle by truncating one or two corners such that the cropped shape has at least five sides. The value of the lower regions of the virtual image area which have been cropped out is not warranted. In fact, the cropped shape of the virtual image area may comprise a multisided shaped (e.g. polygon) having at least one truncated corner such that the cropped shape has at least five sides. The cropped shape of the virtual image area may be formed by truncating two or four corners of a rectangular such that the cropped shape has at least eight or ten sides. An improved head-up display for augmented reality is provided.

The virtual image may be used to augment reality for the driver. The virtual image overlays an area of the road. It may be preferable for the overlaid area to be symmetric. However, because the driver is positioned to one side of the vehicle (i.e. the off-side), the inventor has recognised that it may be advantageous if the shape of the virtual image area is asymmetric. More specifically, the asymmetry of the virtual image area may be arranged to visually-compensate for the spatially-offset position of a driver within the vehicle. The asymmetry of the virtual image area may be arranged to overlay a symmetric region of space. The asymmetry may be provided changing the lengths of the sides of the virtual image area. For example, opposite sides of the shape may have a different length. Optionally, all opposite sides of the shape have a different length.

Notably, the inventors have also questioned the assumption that the eye-box should be rectangular. Conventionally, the eye-box is rectangular. This is synergistic with a rectangular display device. In conventional display (i.e. non-holographic display) using a backlight, unused or off pixels represented wasted light and have a negative effect on optical efficiency. The person skilled in the art would instantly dismiss the idea of restricting picture content to a sub-area of a display area because image contrast and brightness are such huge challenges in head-up display, and it is therefore unacceptable to waste light by restricting the picture content area as disclosed herein. However, in some cases, the gains in other areas may outweigh these losses—as disclosed herein.

The eye-box area is an area of space within which the virtual image is visible. More specifically, the eye-box area is an area within which the entire virtual image is fully visible—i.e. all areas of the virtual image are visible. The position, size and shape of the eye-box are optimised during the design process. The optical performance of the system is optimised for the required eye-box. The eye-box may be considered an area containing a plurality of optimised viewing positions. If the eye-box is too small, very little viewer movement may be tolerated. If the eye-box is too large, the physical and optical requirements become impractical. The convention is that an eye-box is rectangular in shape and twice the interpupil distance enabling a range of motion over which a binocular view of the virtual image is maintained. In some embodiments, the eye-box is a viewing window containing all optimised eye positions from which the entire/full/complete virtual image of the picture content within the sub-region is visible to both eyes.

In accordance with this disclosure, the position and size of the eye-box are determined by human ergonomics and modelling, and the shape of the eye-box is informed by an analysis of head and eye motion in a moving vehicle. In accordance with this disclosure, the optimised eye-box shape is positively beneficial to the size of the optical components and the size of the overall head-up display package.

The eye-box area may comprise a substantially quadrilateral core shape and at least one cropped corner. The term "cropped" is merely used to as a convenient way to describe the shape. Specifically, it reflects that the resultant shape is the same as the shape that would be formed if one corner of a quadrilateral were cropped off or cut-out or cut-away. The term "cropped" therefore merely indicates that a portion of the quadrilateral core or central shape appears to be absent. The term "cropped" does not reflect the method by which the resultant shape is achieved. The resultant shape is smaller than the quadrilateral core shape. The quadrilateral core shape may be a rectangle, optionally, wherein the long dimension of the rectangle is substantially horizontal during normal usage. The cropping disclosed herein may be straight. In some embodiments, each cropped corner has a triangular shape. The term "core" is used to refer to the central, main or dominant component/feature of the shape.

The eye-box area may have an octagonal shape or diamond shape. The eye-box may have a shape comprising at least five straight sides, optionally, at least six straight sides such as eight straight sides.

The at least one cropped corner comprises two or four cropped corners. The two or four cropped corners are equal in size in at least one dimension, optionally, equal in size in two perpendicular dimensions. Each cropped corner may have a size in a first dimension of 15% to 45% the maximum size of the eye-box area in the first dimension. The eye-box area may alternatively have a substantially elliptical shape.

The picture generating unit may be of any type. The picture generating unit may be a holographic projector. The picture generating unit may comprise a light source and a spatial light modulator. The light source may be arranged to emit light. The spatial light modulator may be arranged to receive the light from the light source and spatially-modulated the light in accordance with computer-generated holograms displayed on the spatial light modulator to form a holographic reconstruction conforming to each picture. The holographic reconstruction is the picture. The holographic reconstruction may be formed in free space or may be formed on a surface such as a screen or diffuser. The picture generating unit may therefore further comprise a light-receiving surface arranged to receive the spatially-modulated light such that each holographic reconstruction conforming to a picture is formed thereon.

The window may be a windscreen. The head-up display may therefore provide the driver with useful information during driving by augmenting reality.

The term "corresponding" and "in correspondence with" are used herein with respect to a pair of elements or components to reflect a broad correlation between physical characteristics of a first element (e.g. area, shape or image) and those of a second element such that a change in the first element causes a similar or even equivalent or corresponding change in the second element. Elements which are "corresponding" may be identical, or substantially identical, in shape but they are not necessarily so. For example, elements which are "corresponding" may have the same, or substantially the same, general shape but different size. For example, the second element may be a perfect or imperfect magnification of the first element. The word "corresponding" is therefore further used to reflect that the general form—e.g. shape—of the first element is closely related to and/or based on that of the second element. Differences between the first element and second element may be caused by components having a complex curvature (such as a windscreen optical combiner) imperfects in components of the system, such as optical aberrations or distortions, or counter-measures to imperfects such as correctional factors.

The term "light of the picture" is used herein to refer to the light which forms the picture. The "light of the picture" may be monochromatic or polychromatic. The "light of the picture" may be composite colour. For example, the "light of the picture" may comprise red, green and blue light. The "light of the picture" may be polarised.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE FIGURES

Specific embodiments are described by way of example only with reference to the following figures:

FIG. 11 shows a table of the results illustrated in FIGS. 8A-C, 9A-C and 10A-C.

The same reference numbers will be used throughout the drawings to refer to the same or like parts.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration of Holographic Picture Generating Unit

Figure 1:
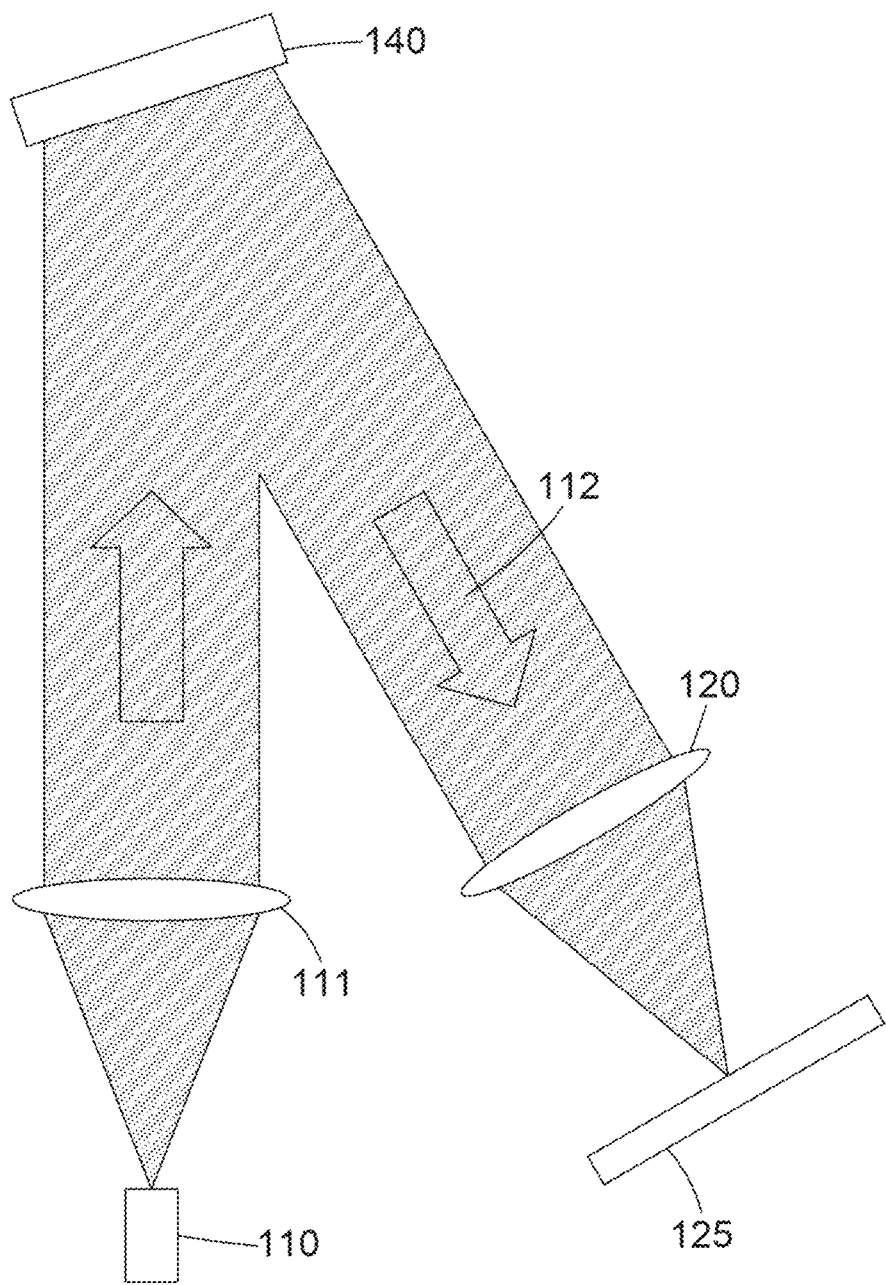
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wave-front of light to be incident on the SLM. In FIG. 1, the direction of the wave-front is off-normal (e.g. two or three degrees away from being truly orthogonal to the plane of the transparent layer). However, in other embodiments, the generally planar wave-front is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wave-front 112. The exit wave-front 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. A computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
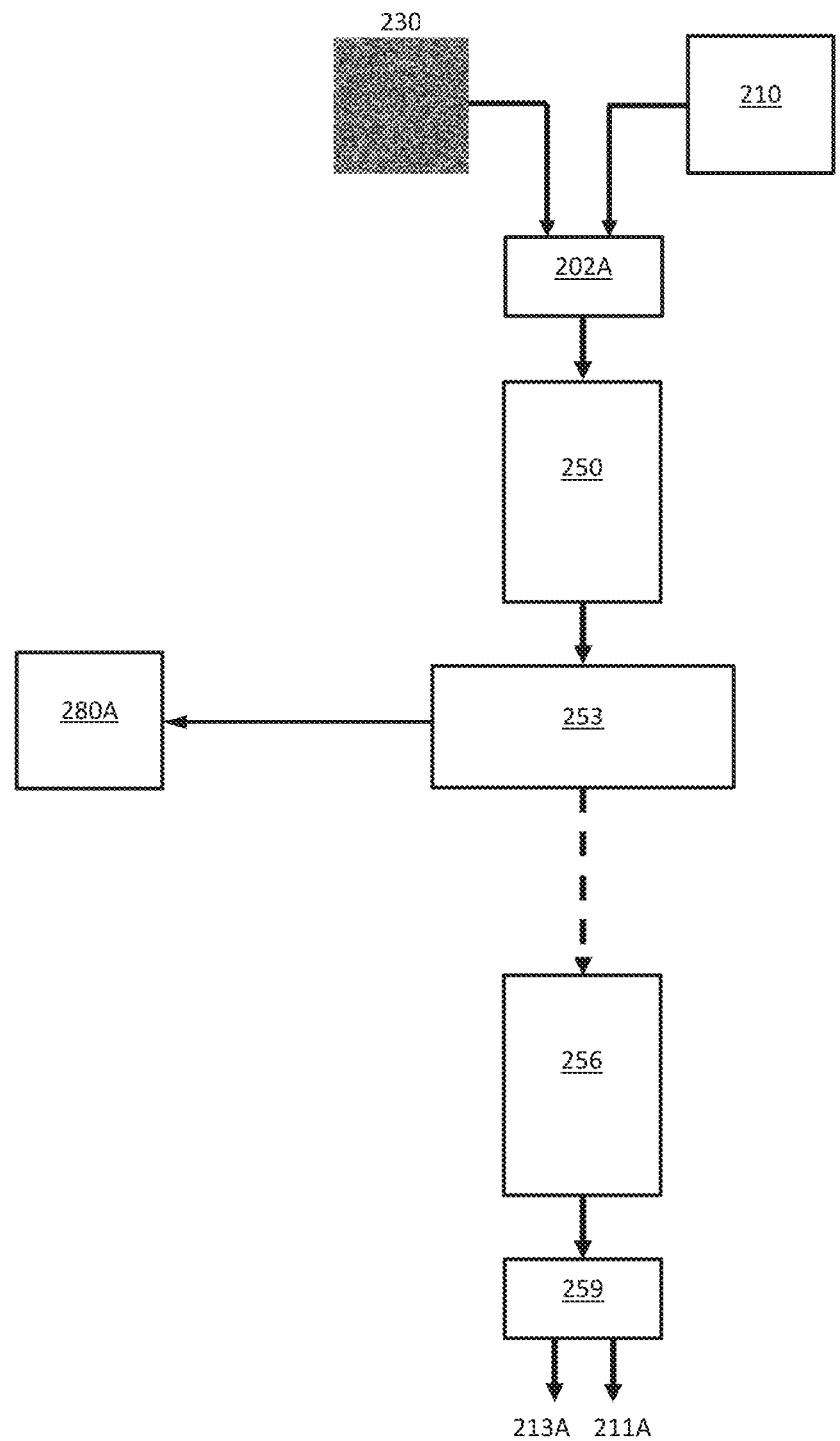
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may performed. However, this comparison step is not essential and in other embodiments, the number of iterations of the algorithm performed is predetermined or preset or user-defined.

Figure 2B:
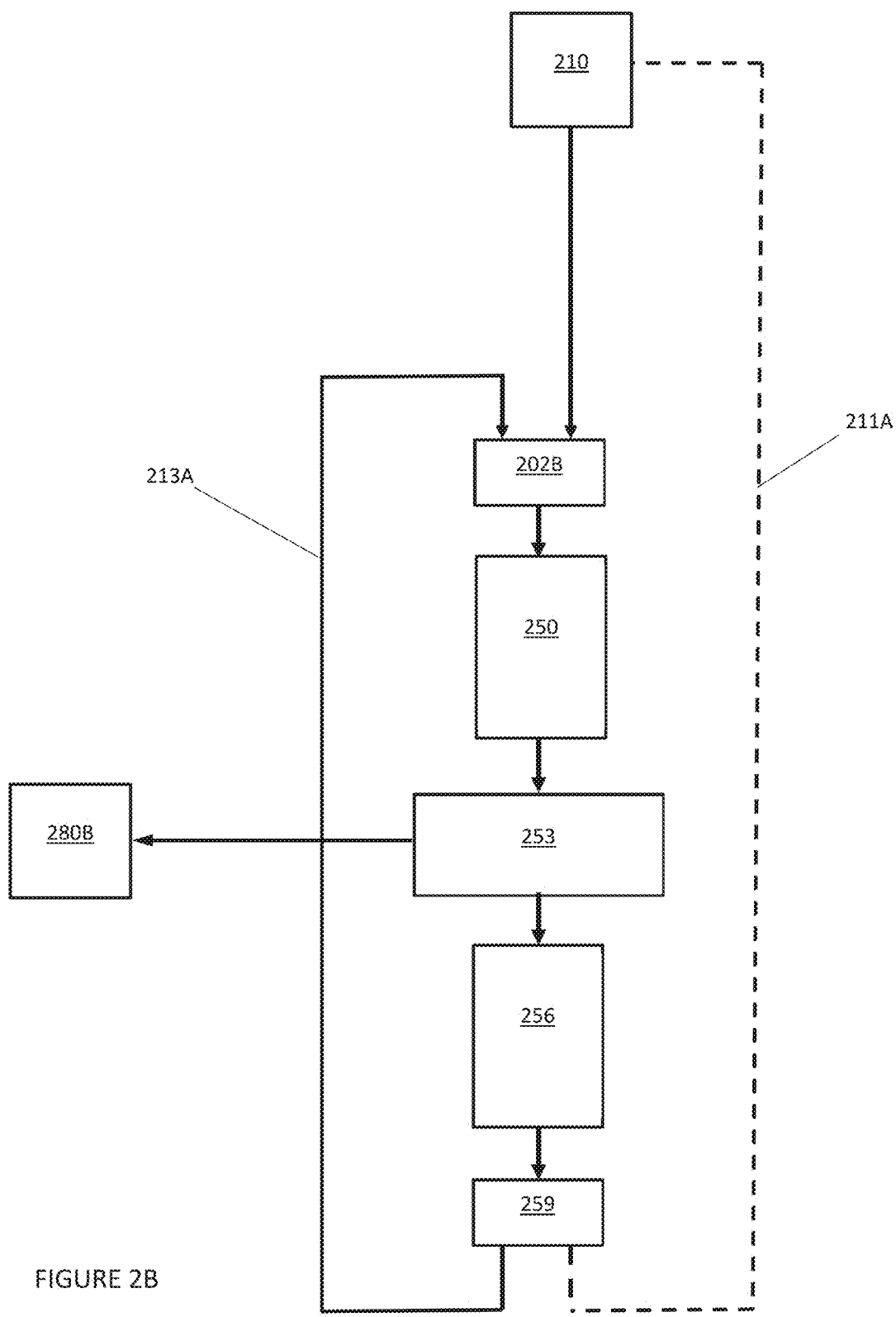
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
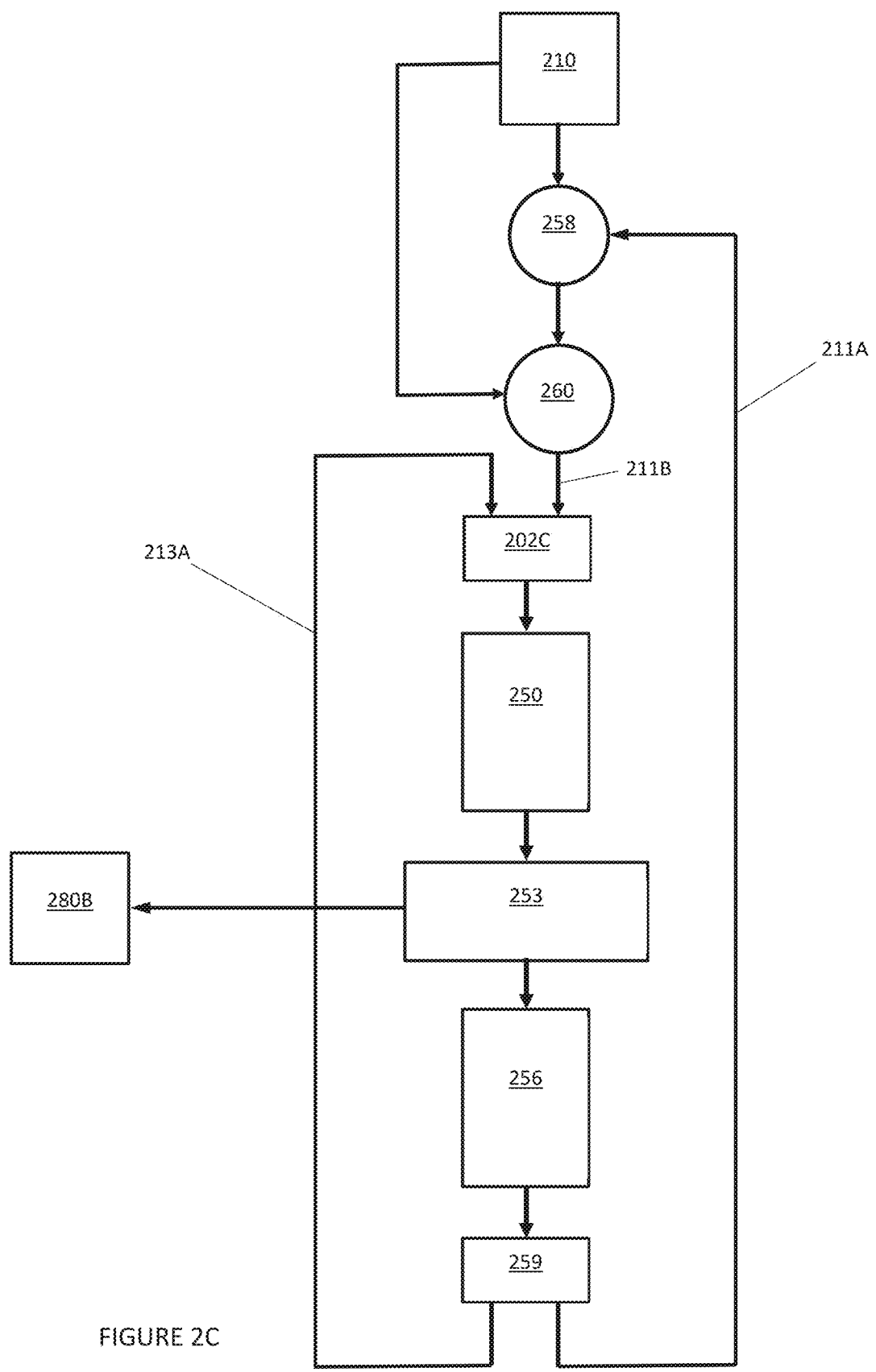
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
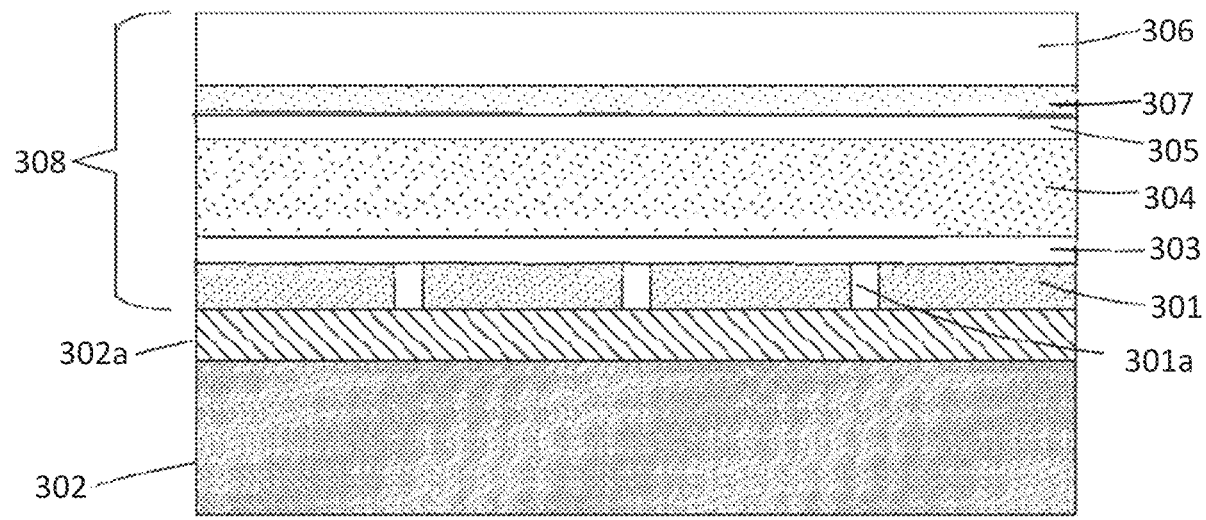
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wave-front, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

As described above, the principles of the present disclosure are applicable to non-holographic picture generating units as well as holographic picture generating units as described above.

Eye-Box Optimisation

The optical relay system of a head-up display is arranged to relay light of a picture from a display area of a picture generating unit to an eye-box such that a virtual image of the picture is visible therefrom. As described herein, the eye-box comprises an area, optionally a volume, from which the virtual image can be fully perceived by a viewer. As the skilled person will appreciate, the virtual image becomes increasingly less completely visible from viewing positions further away from the eye-box.

Ray tracing techniques may be used to measure parameters, such as distortion and horizontal/vertical disparity, in order to objectively identify viewing positions where the virtual image is clear. Based on such measurements, the inventors have recognised that the optical relay system may be configured in order to define the eye-box area to satisfy design requirements, such as packing requirements.

British patent GB 2,575,651B, incorporated herein by reference, includes further details of the general approach utilised to implement the concepts disclosed herein. For the avoidance of any doubt, GB 2,575,561B does not disclose a corner-cropped eye-box. In fact, GB 2,575,561B faithfully reflects the prejudice in the field that the eye-box must be rectangular. The inventors have challenged this prejudice and demonstrated the surprisingly significant gains that may be made.

Figure 4A:
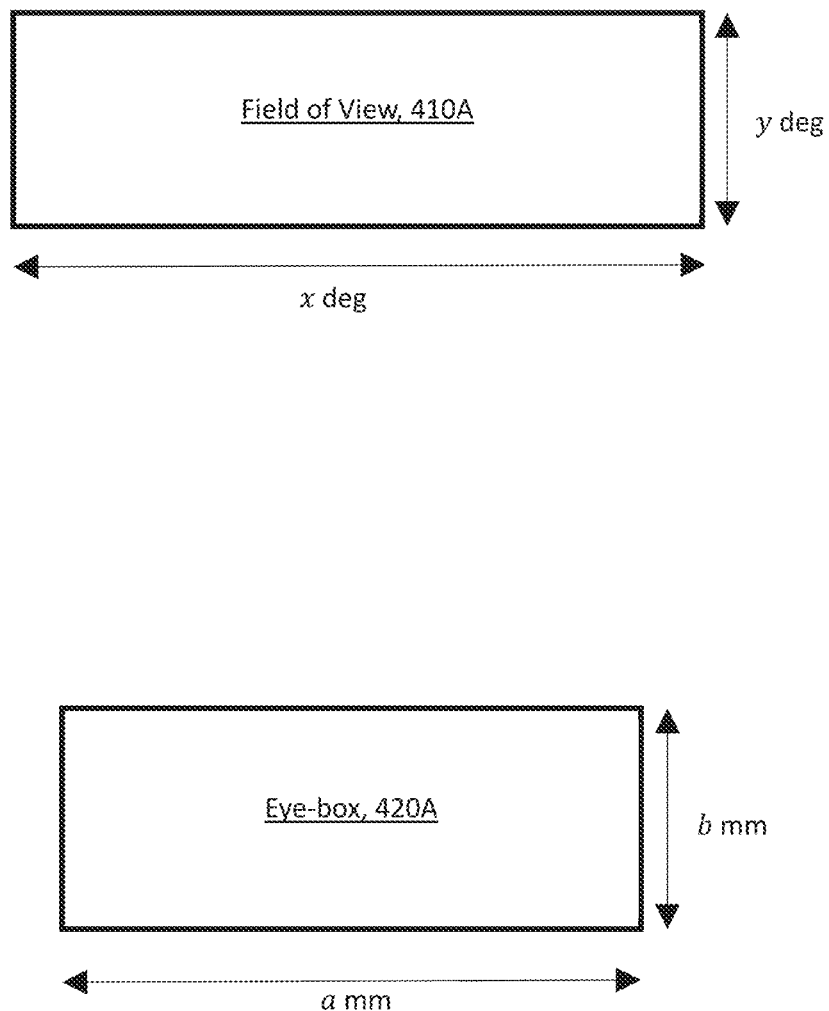
FIG. 4A shows the field of view and eye-box areas of a head-up display having a first, conventional configuration.

FIG. 4A shows the field of view and eye-box areas of a head-up display having a conventional configuration (herein "first configuration"). As shown in FIG. 4A, in the conventional configuration, the field of view 410A comprises a quadrilateral area having a relatively high aspect ratio. In particular, the width is greater than the height of the field of view 410A. In the illustrated arrangement, the width spans x degrees horizontally and the height spans y degrees vertically. The ratio x:y may be 2:1 or 16:9, for example. As described above, the field of view 410A corresponds to an area within which the virtual image is formed by the head-up display. A field of view having a relatively high aspect ratio is suitable for many applications, including automotive applications and applications that display widescreen images. In the conventional configuration, the eye-box 420A also comprises a quadrilateral area having a relatively high aspect ratio. In particular, the width is greater than the height of the eye-box 420A. In the illustrated example, the width is a mm and the height is b mm. However, typically the ratio a:b is lower that the ratio x:y. As described above, the eye-box 420A corresponds to an area within which the virtual image can be fully perceived by the viewer.

Figure 4B:
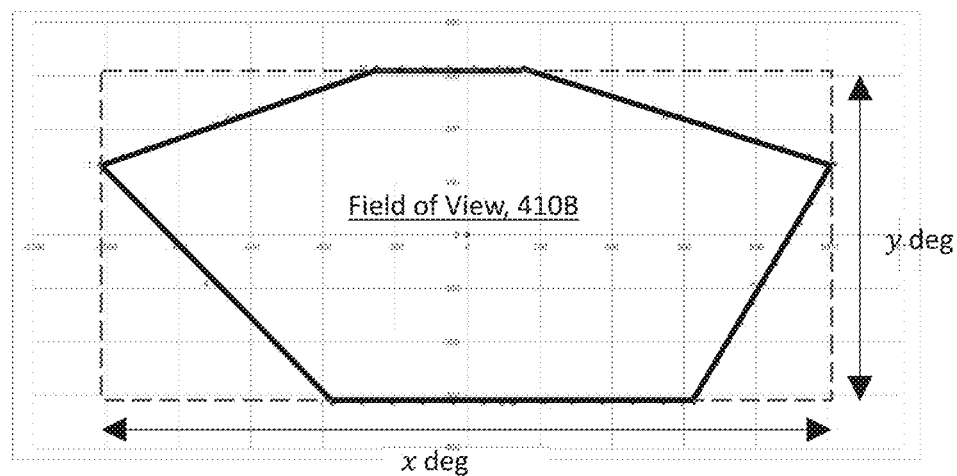
FIG. 4B shows the field of view and eye-box areas of a head-up display having a second configuration comprising a cropped field of view.
Figure 4B:
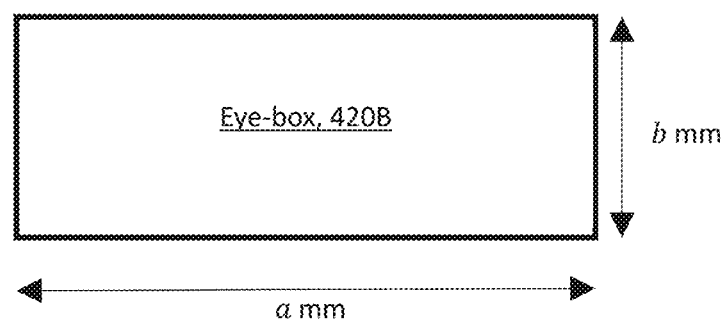

FIG. 4B shows the field of view and eye-box areas of a head-up display having a configuration comprising a cropped field of view (herein "second configuration"). As shown in FIG. 4B, in the second configuration, the field of view 410B comprises a sub-area of the quadrilateral area of the field of view 410A of FIG. 4A. In particular, the field of view 410B comprises a quadrilateral core or basic shape, in which each of the four corners are "cut off" or "cropped". The illustrated example shows that each of the four corners is cropped by different amounts to form an asymmetric sub-area in accordance with an optimised field of view 420B for automotive applications. As the skilled person will appreciate, in other applications, fewer corners of the core quadrilateral shape of the field of view 410B may be cropped and/or the corners may be cropped to form a symmetric sub-area thereof. However, the eye-box 420B comprises a quadrilateral area consistent with conventional configuration. Thus, the eye-box 420B is equivalent to the eye-box 420A of FIG. 4A.

Figure 4C:
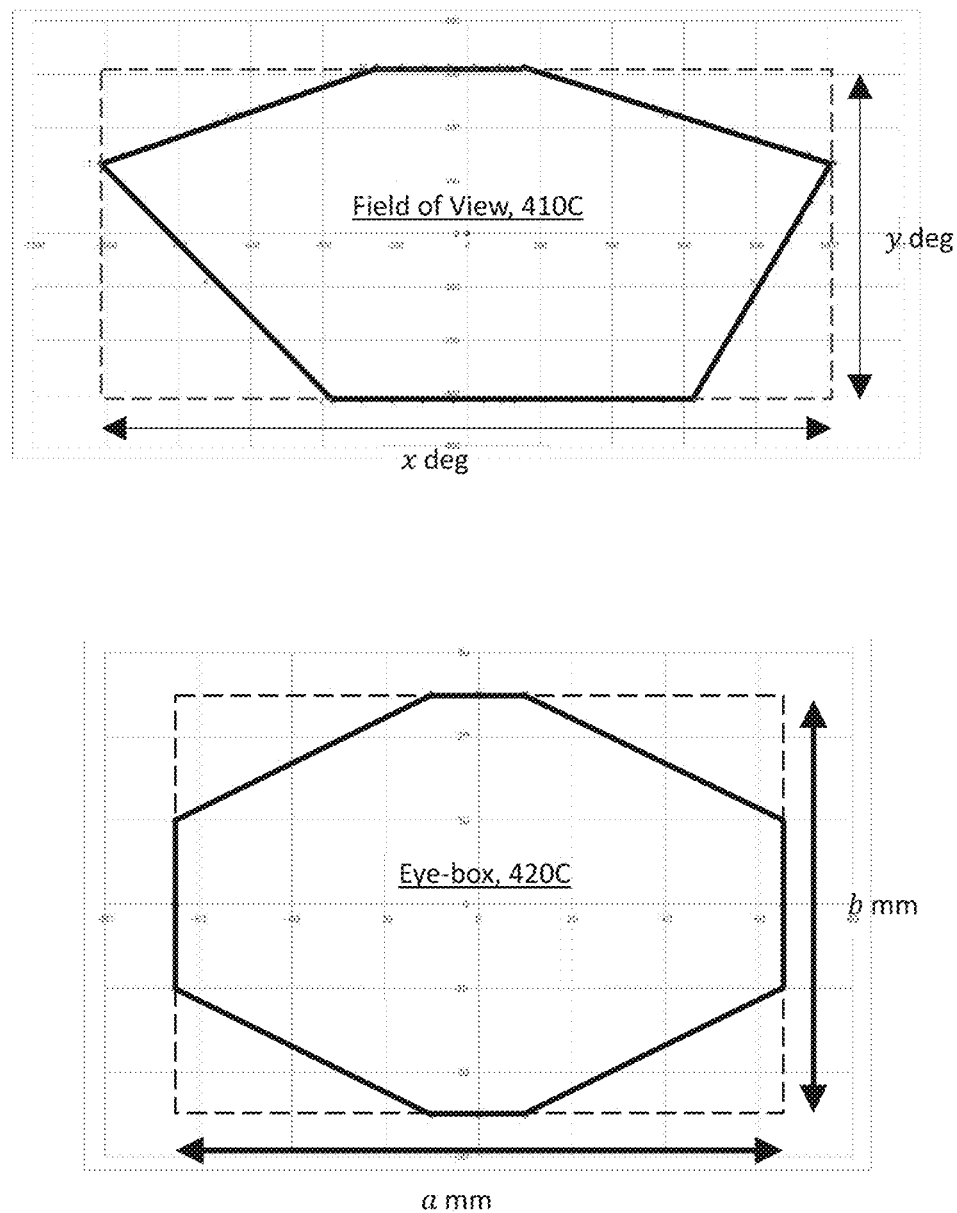
FIG. 4C shows the field of view and eye-box areas of a head-up display having a third configuration, in accordance with embodiments.

FIG. 4C shows the field of view and eye-box areas of a head-up display having a configuration in accordance with embodiments (herein "third configuration"). As shown in FIG. 4C, in the third configuration, the field of view 410C comprises a sub-area of the quadrilateral field of view 410A of FIG. 4A. In particular, the field of view 410C comprises a quadrilateral core or basic shape, in which each of the four corners are "cut off" or "cropped". In the illustrated arrangement, the field of view 410C is equivalent to the field of view 410B of FIG. 4B, and so is optimised for automotive applications.

In accordance with the present disclosure, the eye-box 420C is configured to form a non-rectangular area. Thus, in contrast to the conventional configuration of the eye-box of a head-up display, the eye-box 420C in accordance with the present disclosure comprises a non-quadrilateral area. In particular, in the illustrated example, the eye-box 420C comprises an area having a substantially quadrilateral core or basic shape, in which each of the corners are "cut off" or "cropped". The illustrated example shows that each of the four corners is cropped by a similar amount to form a substantially symmetrical viewing area. As the skilled person will appreciate, in other applications, fewer corners of the core quadrilateral shape of the eye-box 420C may be cropped and/or the corners may be cropped to form a generally symmetric viewing area.

Figure 4D:
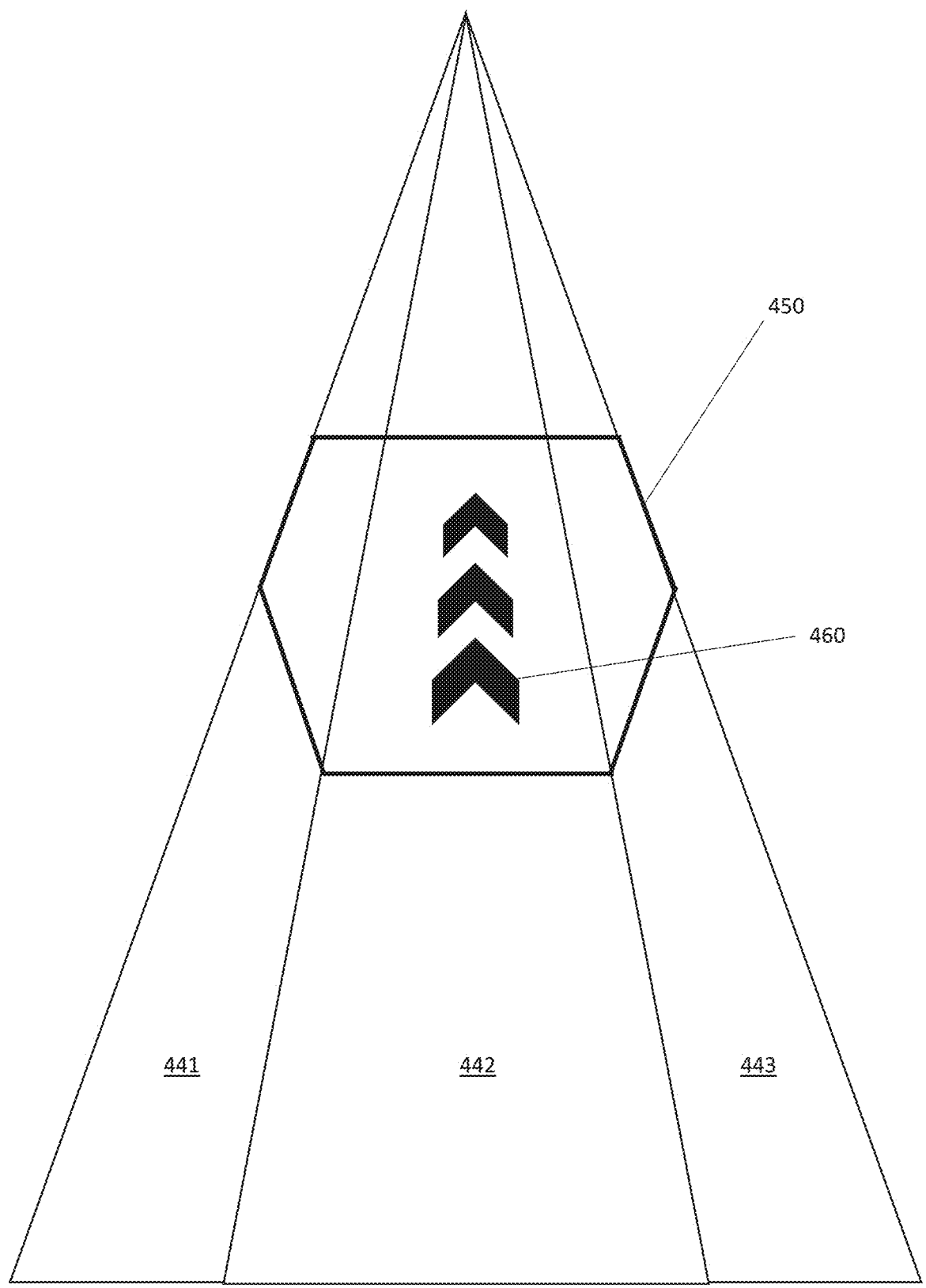
FIG. 4D the field of view of a head-up display in which the picture content is displayed in a cropped field of view as in FIGS. 4B and 4C.

FIG. 4D a non-rectangular virtual image area or field of view, similar to FIGS. 4B and 4C. In particular, FIG. 4D shows picture content displayed in the far field within a virtual image area having a hexagonal shape for automotive applications. The virtual image area 450 overlays a first lane 441, second lane 442 and third lane 443 of a carriageway or road. As shown in FIG. 4D, the hexagonal shape of the virtual image area excludes regions outside the carriageway. The defined hexagon may be regular or irregular. In other embodiments, only two corners (e.g. the two lower corners) of the rectangular virtual image area of FIG. 4A are truncated. As shown in FIG. 4D, picture content—such as chevrons 460 for navigation—may be displayed in the virtual image area. The image content may be confined to one lane—such as second lane 442—or it may extend over two or more lanes including first lane 441 and/or third lane 443. It may be said that the picture content of the virtual image overlays the scene at a distance, or range of distances, from the viewer at the eye-box.

The inventors have found that by configuring the eye-box as a non-rectangular viewing area as described herein, the optical performance of the system is improved without compromising the viewer's ability to fully perceive the virtual image from all desired eye positions, such as the range of eye positions used by a driver during vehicle movement. In particular, the inventors have unexpectedly found that by optimising the configuration for forming a non-rectangular eye-box as described herein, improvements in the distortion and vertical/horizontal disparity of points of the virtual image (herein "virtual image points" or "field points") are found at viewing positions within the eye-box. Thus, the image quality of a head-up display configured to have a non-rectangular eye-box is improved at all positions within the eye-box compared to a head-up display configured with conventional rectangular eye-box. The inventors are further found that configuring a head-up display with a non-rectangular eye-box shows improvements in optical performance, and thus image quality, irrespective of whether or not the field of view of virtual image area is also cropped as in the examples of FIGS. 4B and 4C. Thus, it is possible to configure a head-up display with a rectangular area of the field of view 410A of the conventional arrangement of FIG. 4A in combination with the non-rectangular area of the eye-box 420C of FIG. 4C.

Figure 5:
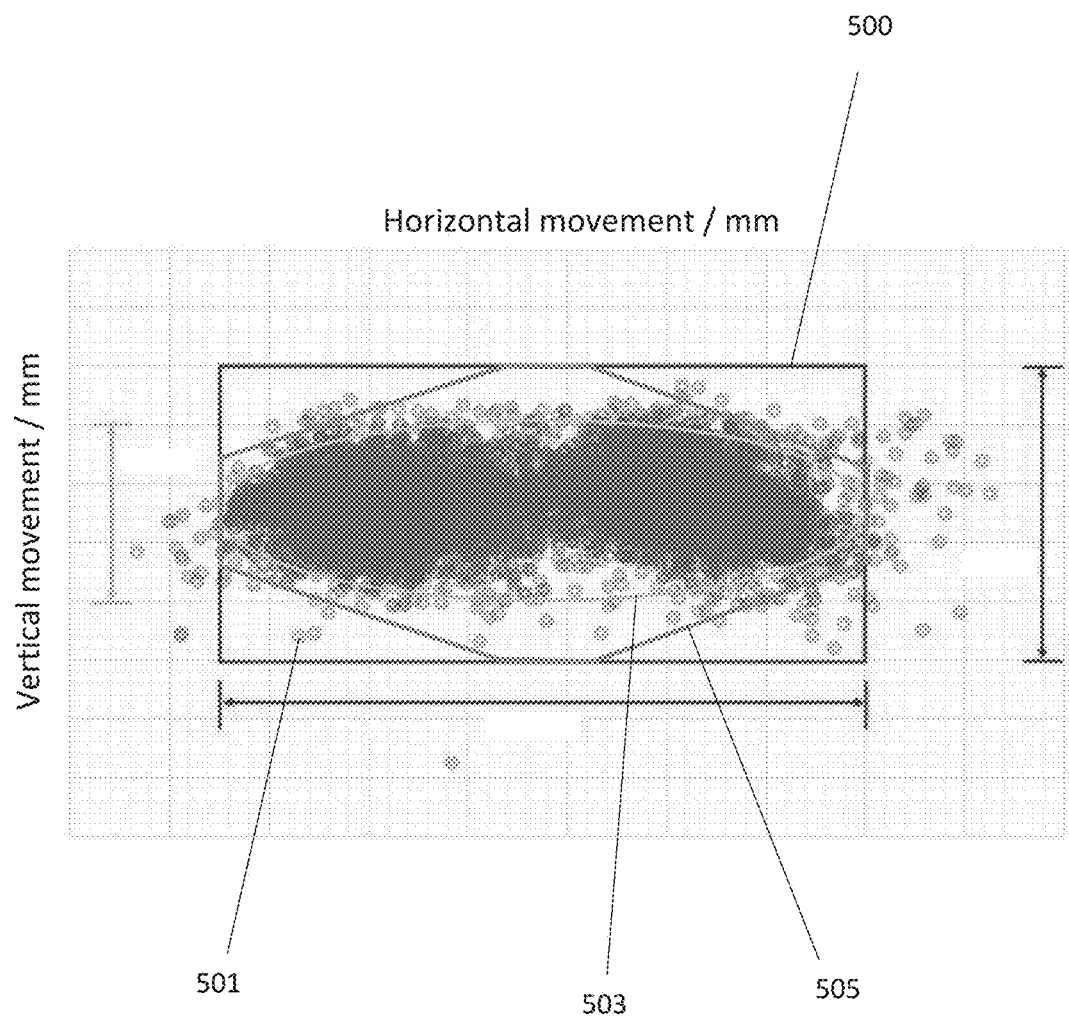
FIG. 5 shows the results of a study of the eye positions within an eye-box of a head-up display.

FIG. 5 shows the results of a study of the eye positions within a conventional rectangular eye-box of a head-up display. In particular, the eye-box comprises a rectangle 500 with a longer horizontal dimension/width that vertical dimension/height. The circles 501 indicate the observed eye positions of a viewer over a period of time. As can be seen, the majority of eye positions are within an ellipse 503 having a length corresponding to the length of the eye-box and a width of less than the height of the eye-box. In particular, in the illustrated example, the width of the ellipse 503 is 30 mm. The major axis of the ellipse 503 is aligned with the centre of the height of the eye-box, and the minor axis of the ellipse 503 is aligned with the centre of the width of the eye-box.

The inventors have recognised that the corners of the viewing area forming the rectangular eye-box 500 remain largely unused during normal use of the head-up display. Thus, it is possible to configure the shape of the eye-box by "cutting-off" or "cropping" the corners of the conventional rectangular shape, without unduly compromising the viewer's ability to clearly perceive the displayed virtual image during normal use. Thus, the eye-box can be reconfigured to have non-rectangular shape 505.

Optical Component Size Optimisation Results

In embodiments of the present disclosure, the optical relay system comprises an optical component or optical element such as a mirror. Typically, the optical component has optical power in order to magnify the image received from the picture generating unit. The optical component may be a free-form shape configured to compensate for distortion of the virtual image formed by another optical component, such as an optical combiner, upstream thereof.

Figure 6A:
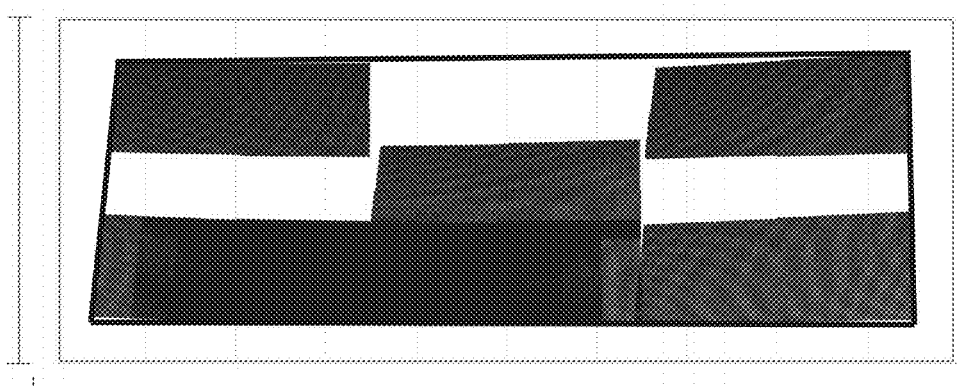
FIG. 6A shows an example ray bundle footprint of light of a picture on an optical component of an optical relay system of a head-up display having the first configuration.
Figure 6B:
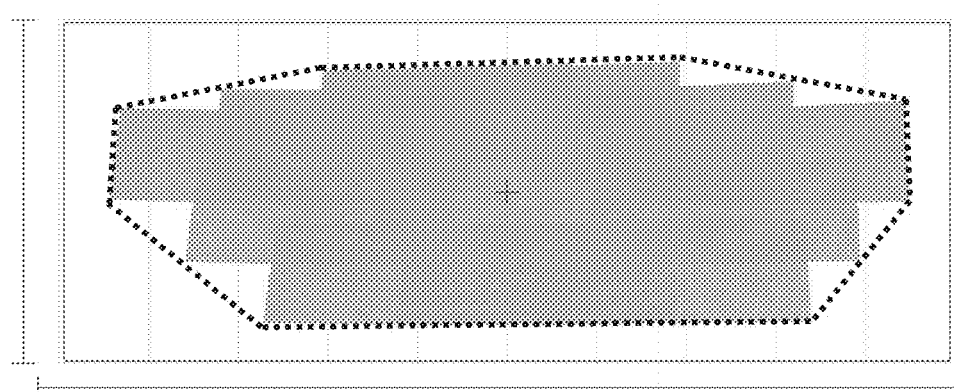
FIG. 6B shows the example ray bundle footprint of light of a picture, equivalent to FIG. 6A, on an optical component of an optical relay system of a head-up display having the second configuration.
Figure 6C:
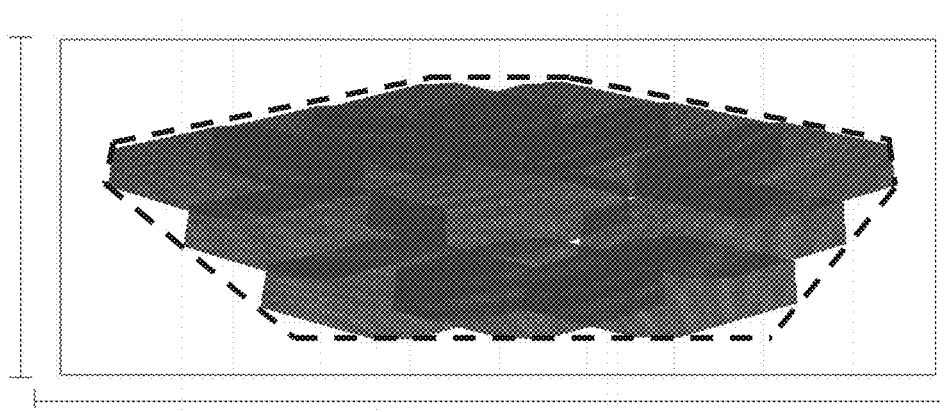
FIG. 6C shows the example ray bundle footprint of light of a picture, equivalent to FIGS. 6A and 6B, on an optical component of an optical relay system of a head-up display having the third configuration in accordance with embodiments.

FIGS. 6A-C show suitable example optical components optimised for the first, second and third configurations of a head-up display as described above. In particular, in each case, the optical component is shaped in generally in correspondence with the shape of the respective field of view 410A-C shown in FIGS. 4A-C.

In particular, the optical component shown in FIG. 6A comprises a trapezoid shape generally corresponding to the quadrilateral shape of the field of view 410A. The optical component shown in FIG. 6B comprises a quadrilateral core shape with four cut-off corners generally corresponding to the shape of the field of view 410B. Finally, the optical component shown in FIG. 6C comprises a quadrilateral core shape with four cut-off corners generally corresponding to the shape of the field of view 410C. It should be noted that whilst the shape of the field of view formed in the second and third configurations of FIGS. 4B and 4B is the substantially the same, the optical component of FIG. 6C is cropped more than the optical component of FIG. 6B, as a result of the reduced area of the non-rectangular eye-box.

FIGS. 6A-C shows example ray bundle footprints of light of a picture on the respective optical component. Each "block" shown in FIGS. 6A-C relates to one virtual image point, called a "field point", and all allowed eye positions. The drawings show 12 different virtual image points, for ease of illustration. The skilled person will appreciate that, in practice, many more virtual image points make up the virtual image and so many other positions on the optical component receive light of the picture. Since each illustrated field point block relates to all allowed eye positions (i.e. where the virtual image is clearly visible), the shape of the block largely corresponds to the shape of the eye-box. Thus, each block relates to all possible eye positions in the eye-box for the corresponding field point.

Referring to FIG. 6A, in the first configuration, it can be seen that a large area optical component is needed to form the virtual image points at all eye positions. However, as shown in FIG. 6B, in the second configuration, the light footprint formed by the virtual image points at all eye positions is limited to a smaller area. Thus, the optical component can be cropped by cutting of the corners thereof, to form the shape of the sub-area shown by dotted outline. It may be said that the shape of the optical component is shaped in correspondence with the shape of the sub-area of the quadrilateral display area (i.e. field of view or virtual image area). However, as shown in FIG. 6B, the shape is not the identical to, but largely corresponds to, the shape of the field of view 410B of FIG. 4B. In particular, the amount of cropping of the optical component is less than the amount of cropping of the quadrilateral shape of the display area, but the cropping of each corner is in the same shape and proportion. Finally, as shown in FIG. 6C, in the third configuration, the light footprint formed by the virtual image points at all eye positions is limited to a sub-area of the optical component, which is smaller than the sub area of FIG. 6B. Thus, the optical component can be cropped by cutting of the corners thereof, to form the shape of the sub-area shown by dashed outline. It may be said that the shape of the optical component is shaped in correspondence with the shape of the sub-area of the quadrilateral display area (i.e. field of view or virtual image area) and the shape of the eye-box. The amount of cropping of the optical component shown in FIG. 6C is more than the amount of cropping shown in FIG. 6B. Nevertheless, the amount of cropping of the optical component may be slightly less than the amount of cropping of the quadrilateral shape of the display area, but the cropping of each corner is in the same shape and proportion. As the skilled person will understand, the shape of the optical component in each of FIGS. 6B and 6C is defined by a limited number of field points that were used in this study form the light footprint. A more tailored shape, and thus more tailored cropping of the optical component, can be identified using a larger number of field points.

As the skilled person will appreciate, FIG. 6C illustrates just one example of how the shape of the optical component of the optical replay system may be tailored to the shape of the field of view (virtual image area) and the shape of the eye-box. In particular, the example of FIG. 6C is optimised for automotive applications, with irregular cropping to provide an asymmetric-shaped field of view for a three lane road layout for driving on one side or the carriageway. The field of view may have any other shape, whether symmetrical or asymmetrical, according to application requirements. Simulations may be performed to trace field points from a field of view of any desired shape to the optical component and the eye-box, in order to identify the light footprint on the optical component, as in FIG. 6C. Thus, based on the identified light footprint on the optical component, the optimal shape and amount of cropping required for any given application.

Figure 7:
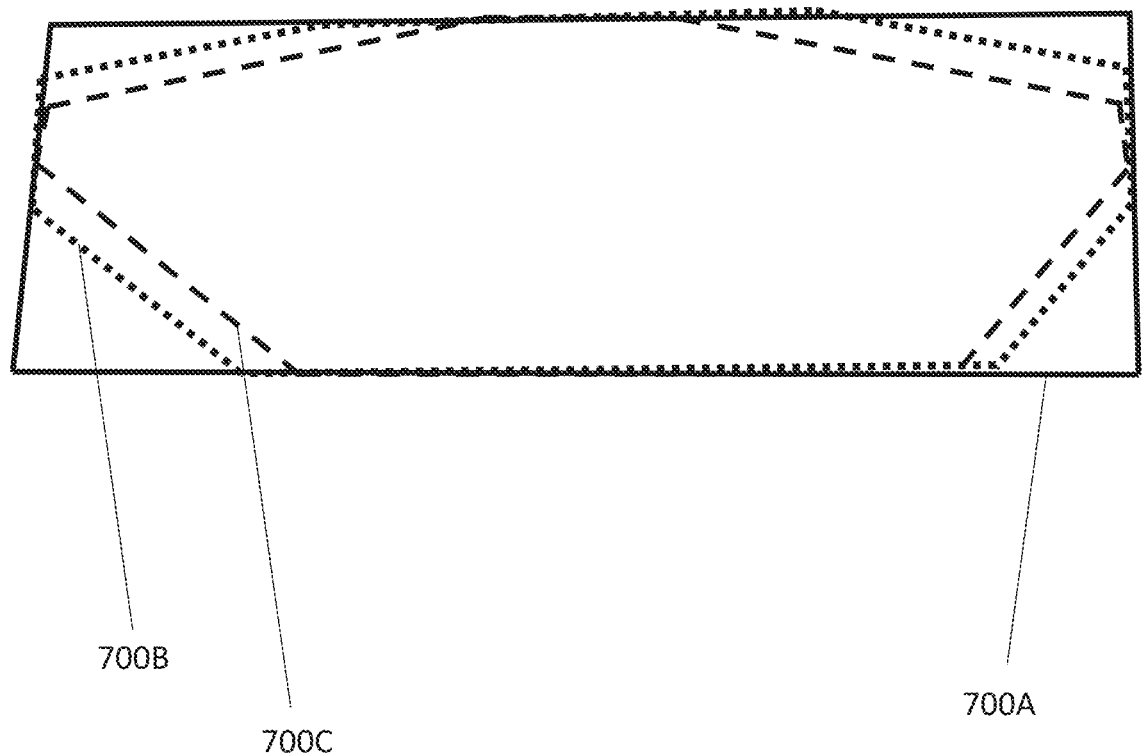
FIG. 7 shows a comparison of the shapes and relative areas formed by cropping the optical component of the head-up display having the first, second and third configurations.

FIG. 7 shows a comparison of the different shapes, and relative size of the areas, of the optical components of FIGS. 6A-C for the first, second and third configurations, respectively. In particular, the solid outline shows the rectangular shape of the optical component 700A of FIG. 6A for the first configuration, the dotted outline shows the cropped shape of the optical component 700B of FIG. 6B for the first configuration superimposed thereon, and the dashed outline shows the cropped shape of the optical component 700C of FIG. 6C for the third configuration superimposed thereon. The area of the optical component 700B is reduced by 12% compared to the optical component 700A. The area of the optical component 700C is reduced by 23% compared to the optical component 700A.

Optical Performance Results

As described above, the inventors considered the differences in optical performance, and, in particular, image quality of the first, second and third configurations of a head-up display as described herein. The inventors found significant improvements in the third configuration described herein, in accordance with embodiments. In particular, the inventors found consistent reductions in distortion, vertical disparity and horizontal disparity at a plurality of eye positions across the range of the positions within eye-box in the vertical and horizontal directions in comparison to the first and second configurations described herein.

Figure 8A:
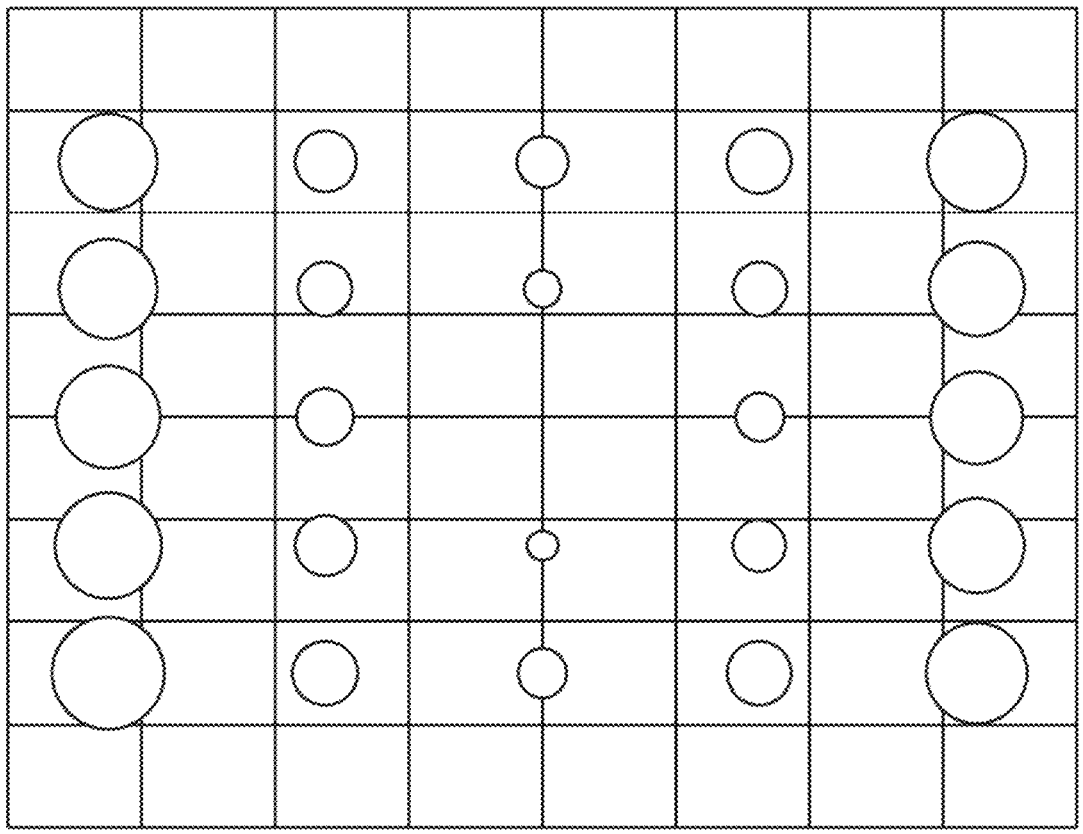
FIGS. 8A, 8B, and 8C show results of the measurement of distortion at example eye positions within the eye-box of the head-up display having the first, second and third configuration, respectively.
Figure 8B:
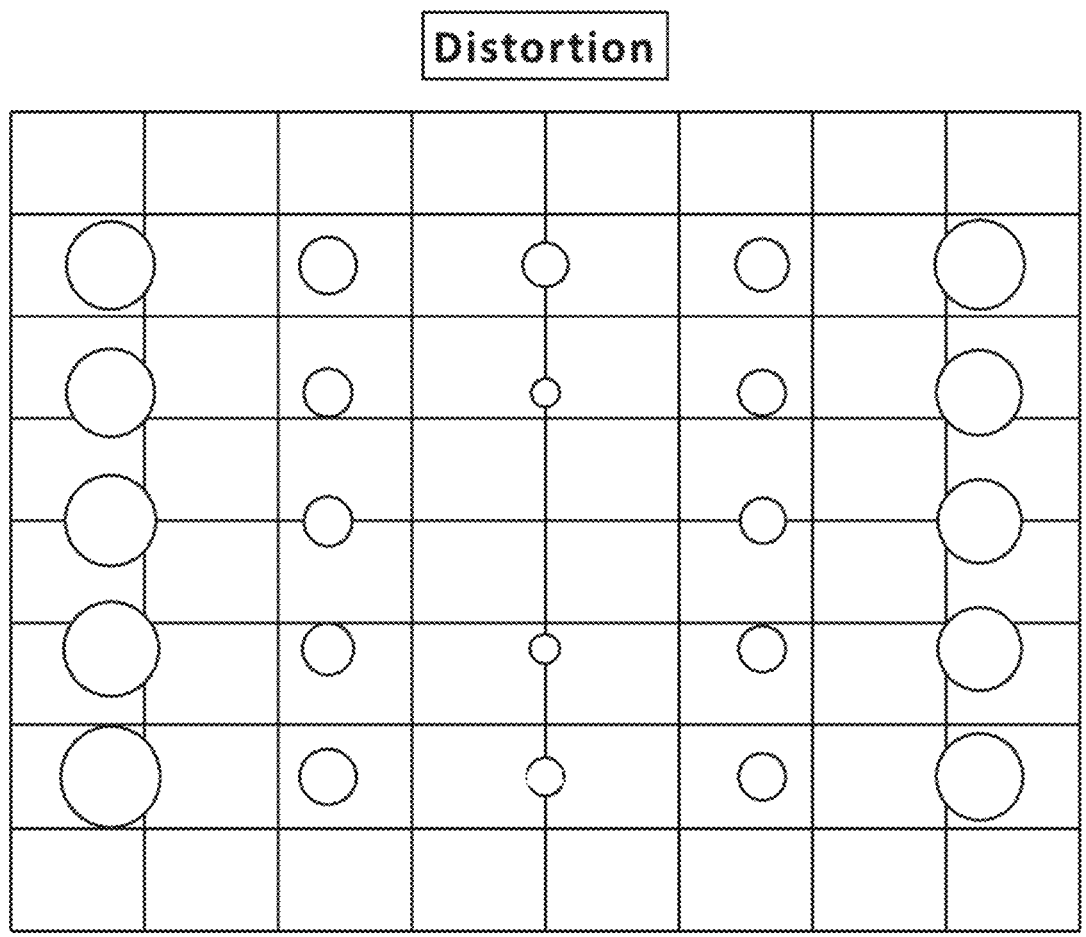
Figure 8C:
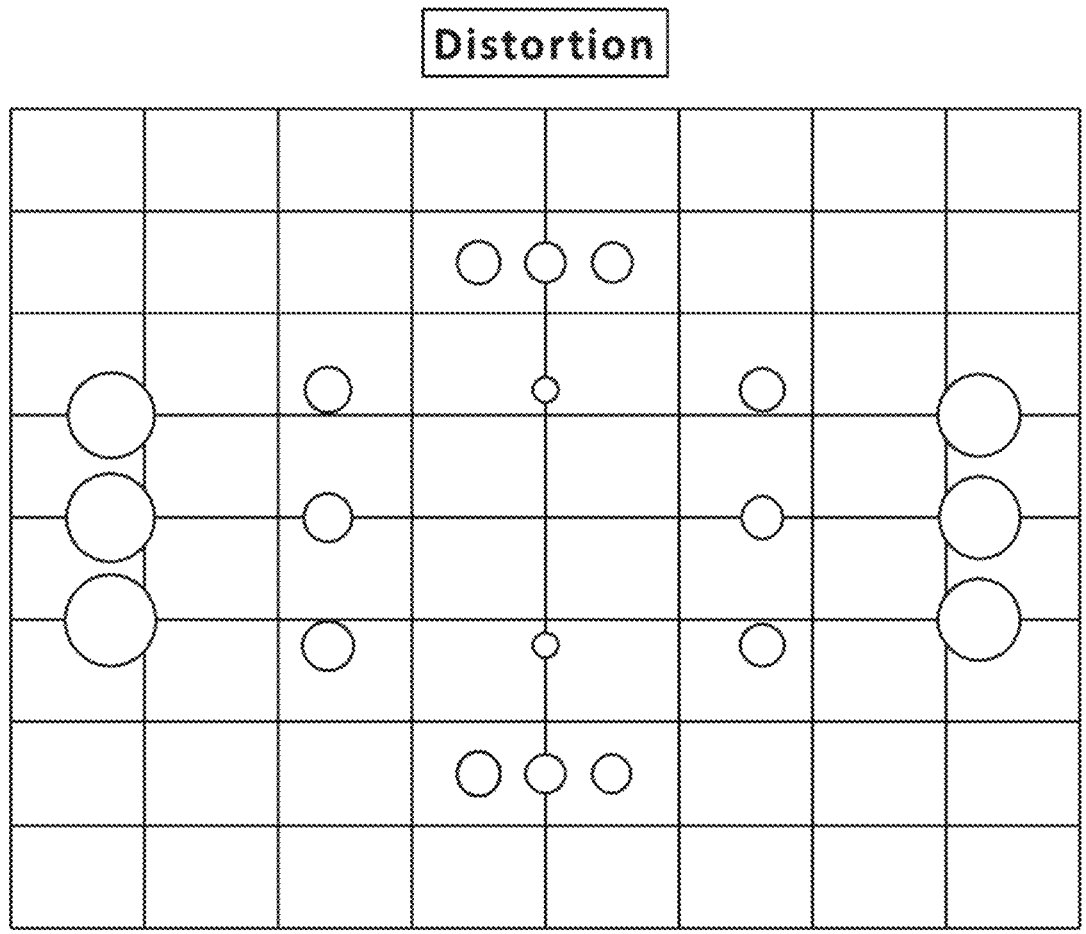

FIGS. 8A to 8C show results of the measurement of distortion at a plurality of eye positions within the eye-box of the head-up display having the first, second and third configuration, respectively.

As the skilled person will appreciate, distortion is a monochromatic optical aberration describing how the magnification in an image changes across the field of view at a fixed working distance. Distortion may be measured using known techniques and may be expressed as a percentage (i.e. percentage aberration). Distortion is a measure of image quality.

FIG. 8A shows the rectangular eye-box area of the first configuration and a sample of 24 eye positions, denoted by circles, within the eye-box, at which distortion was measured. Each circle shows the location of the respective eye position within the eye-box where the distortion was measured, and the size of each circle represents the amount of distortion. Thus, smaller circles represent relatively low distortion measurements and larger circles represent relatively high distortion measurements. As can be seen in FIG. 8A, image distortion is a minimum at the centre point of the eye-box—that is when the eye is positioned at the centre of the eye-box. Image distortion increases when the eye moves both horizontally or vertically from the centre point.

FIG. 8B shows the rectangular eye-box area of the second configuration and the same sample of 24 eye positions, denoted by circles, within the eye-box, at which distortion was measured. As can be seen in FIG. 8B, as with FIG. 8A, image distortion is a minimum at the centre point of the eye-box—that is when the eye is positioned at the centre of the eye-box. Image distortion increases when the eye moves both horizontally or vertically from the centre point. However, the amount of distortion is reduced at the eye positions away from the centre point compared to FIG. 8A, as denoted by the reduced size of the circles.

FIG. 8C shows the non-rectangular eye-box area of the third configuration, in accordance with embodiments and a sample of 20 eye positions, which fall within the non-rectangular eye-box. Thus, a number of eye positions from the sample of 24 eye positions at the corners of the rectangular eye-box area of FIGS. 8A and 8B are omitted from the measurements, and some new eye positions are added adjacent the top and bottom of the vertical midline of the eye-box. As can be seen in FIG. 8C, image distortion once again increases when the eye moves both horizontally or vertically from the centre point. However, the amount of distortion is even further reduced at the eye positions away from the centre point compared to FIGS. 8A and 8B, as denoted by the reduced size of the circles compared to FIGS. 8A and 8B. Accordingly, the results show reduced image distortion, and this improved image quality, at all eye positions within the non-rectangular eye-box of the present disclosure.

Figure 9A:
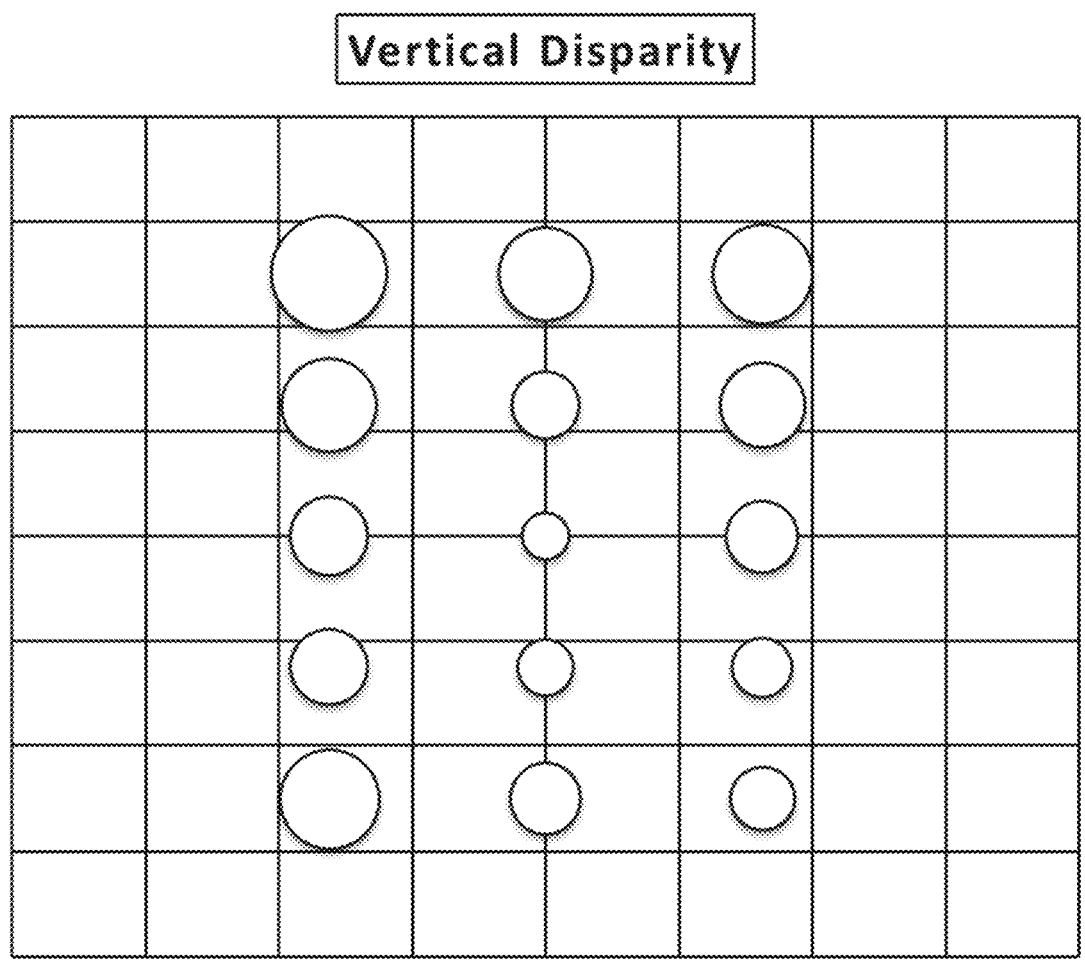
FIGS. 9A, 9B, and 9C show results of the measurement of vertical disparity at example eye positions within the eye-box of the head-up display having the first, second and third configuration, respectively.
Figure 9B:
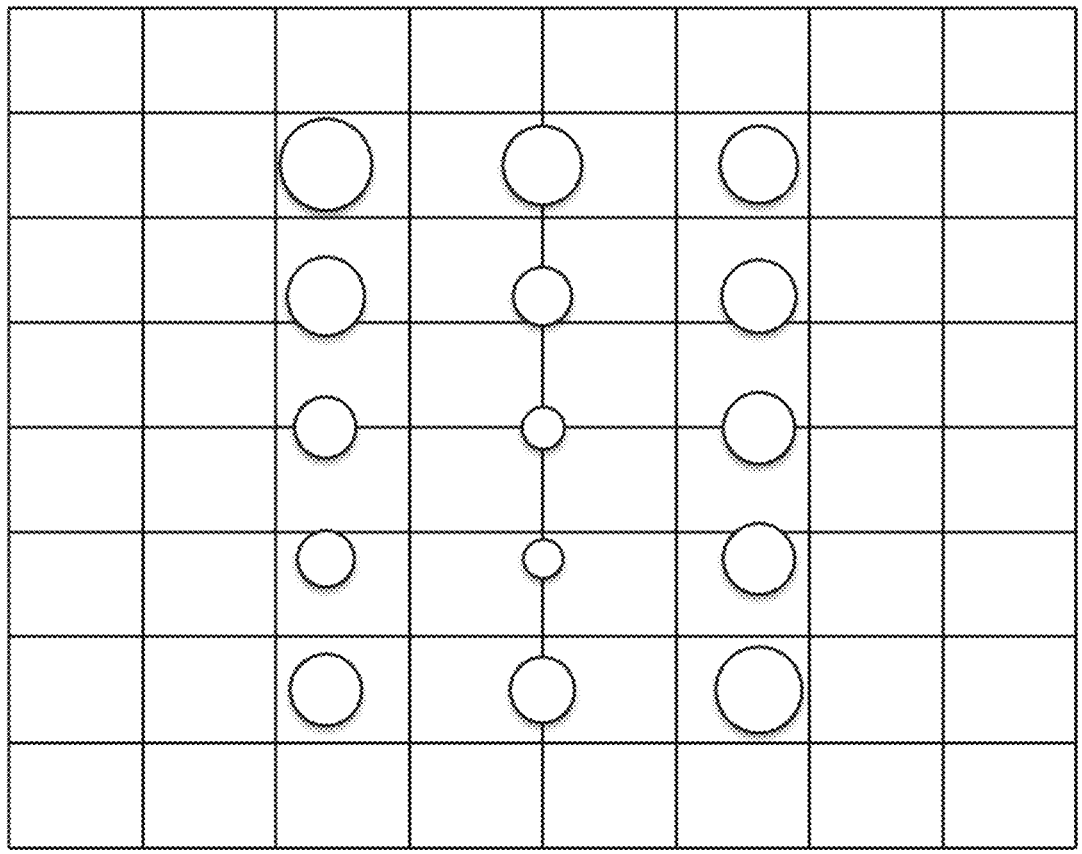
Figure 9C:
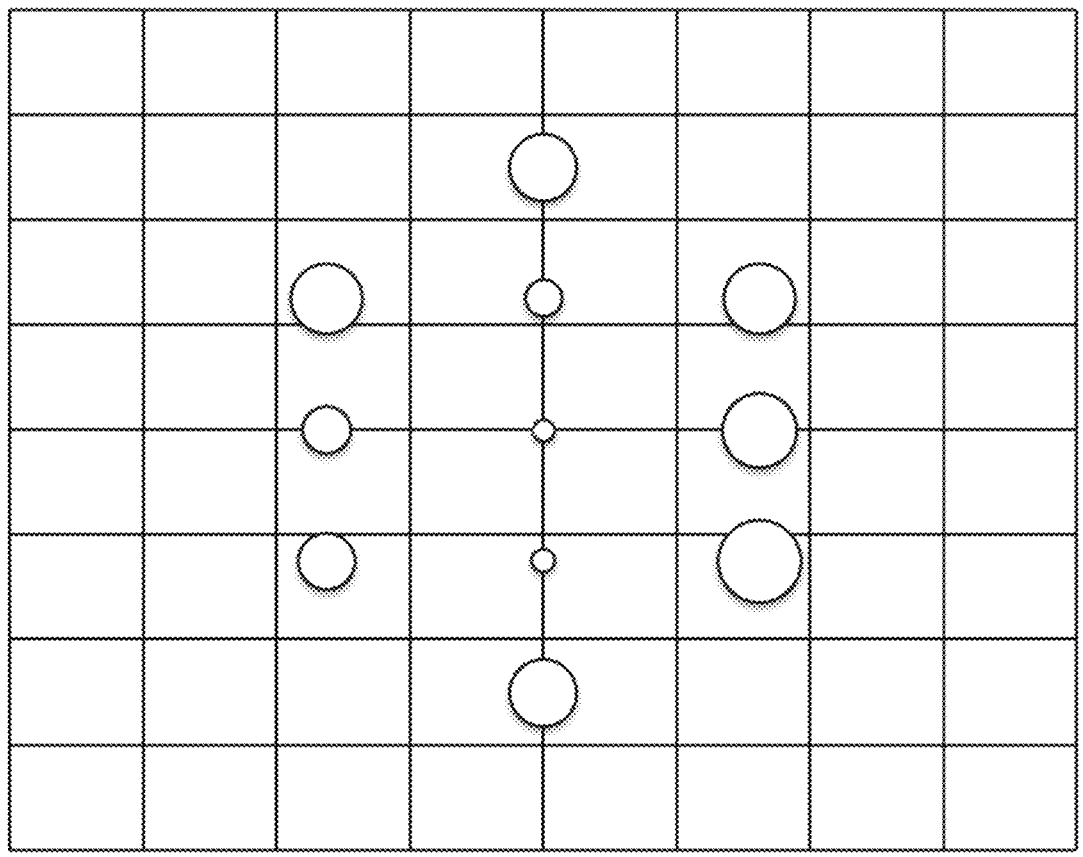
Figure 10A:
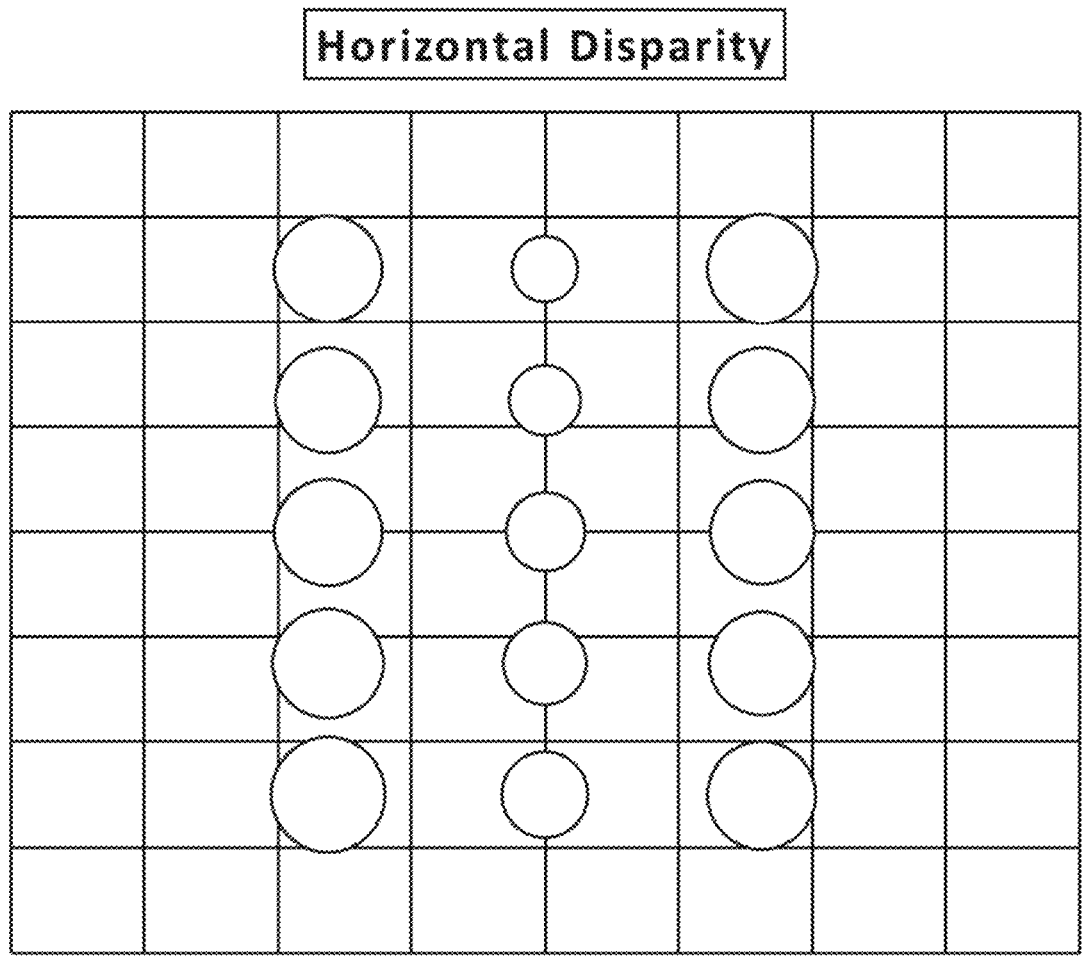
FIGS. 10A, 10B, and 10C show results of the measurement of horizontal disparity at example eye positions within the eye-box of the head-up display having the first, second and third configuration, respectively.
Figure 10B:
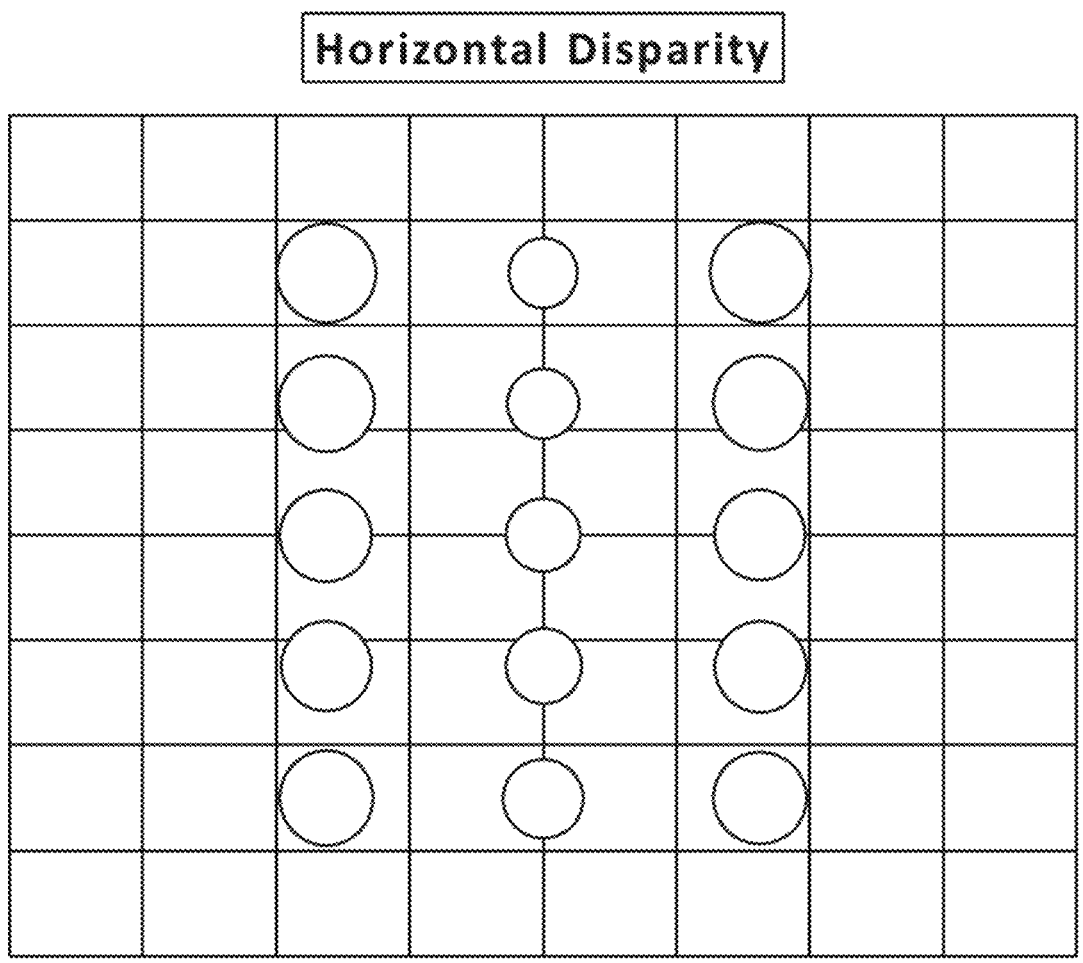
Figure 10C:
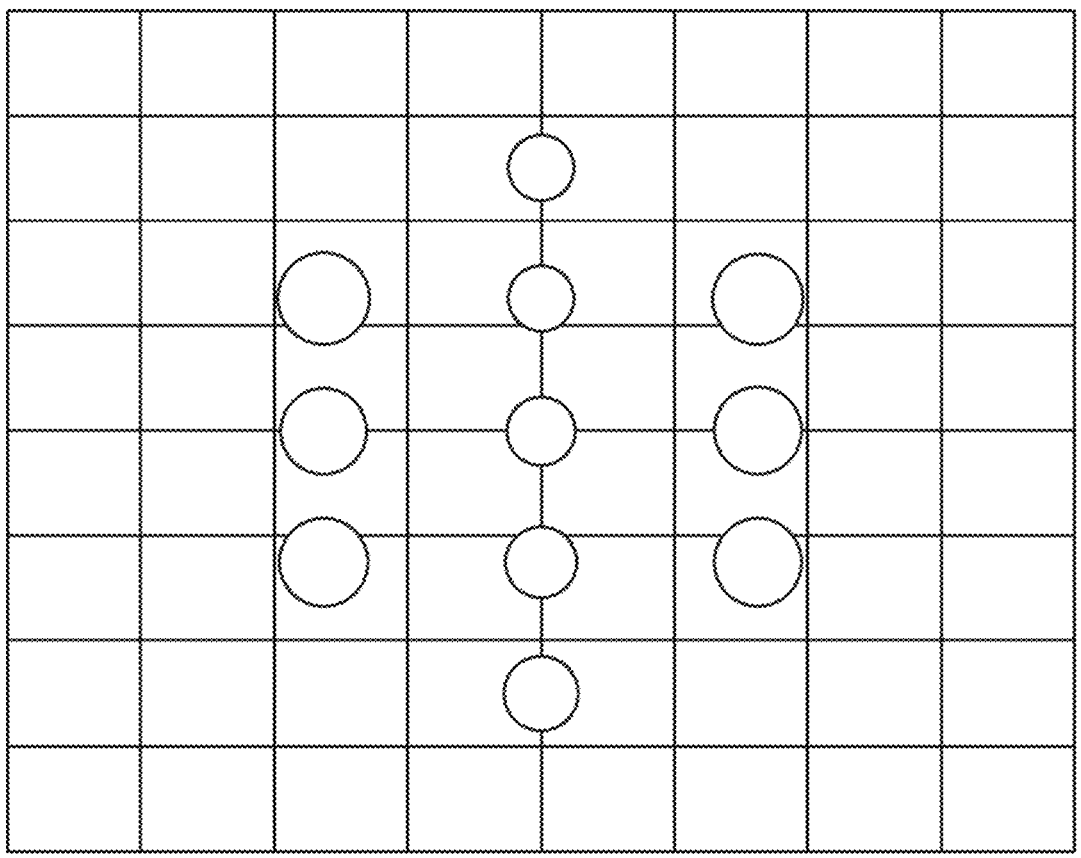

FIGS. 9A to 9C show results of the measurement of vertical disparity of field points, and FIGS. 10A to 10C show results of the measurement of horizontal disparity of field points, formed at a plurality of eye positions within the eye-box of the head-up display having the first, second and third configuration, respectively.

As the skilled person will appreciate, binocular disparity refers to the difference in image location of an object seen by the left and right eyes, resulting from the eyes' horizontal separation or interpupillary distance (parallax). Horizontal and vertical disparity may each be measured using known techniques and may be expressed in and angle in mrad. Binocular disparity, resulting from combined horizontal and vertical disparity, may be a measure of the image quality as seen by viewer.

FIGS. 9A and 10A show the rectangular eye-box area of the first configuration and a sample of 15 eye positions, denoted by circles, within the eye-box, at which respective vertical and horizontal disparity was measured. Each circle shows the location of the respective eye position within the eye-box, and the size of each circle represents the measured vertical or horizontal disparity. Thus, smaller circles represent relatively low disparity measurements and larger circles represent relatively high disparity measurements. As can be seen in FIGS. 9A and 10A, horizontal and vertical disparity is a minimum at the centre point of the eye-box—that is when the eye is positioned at the centre of the eye-box. Horizontal and vertical disparity increases when the eye moves both horizontally or vertically from the centre point. Vertical disparity increases more the further away the eye position moves in the vertical direction from the horizontal midline, and horizontal disparity increases more the further away the eye position moves in the horizontal direction from the vertical midline.

FIGS. 9B and 10B shows the rectangular eye-box area of the second configuration and the same sample of 15 eye positions, denoted by circles, within the eye-box, at which vertical and horizontal disparity was measured. As can be seen in FIGS. 9B and 10B, as with FIGS. 9A and 10A, horizontal and vertical disparity is a minimum at the centre point of the eye-box—that is when the eye is positioned at the centre of the eye-box. Horizontal and vertical disparity increases when the eye moves both horizontally or vertically from the centre point. Vertical disparity increases more the further away the eye position moves in the vertical direction from the horizontal midline, and horizontal disparity increases more the further away the eye position moves in the horizontal direction from the vertical midline. However, the amount of horizontal and vertical disparity is reduced at the eye positions away from the centre point compared to FIGS. 9A and 10A, as denoted by the reduced size of the circles. Note that the vertical and horizontal disparity remain substantially the same at the centre point.

FIGS. 9C and 10C shows the non-rectangular eye-box area of the third configuration, in accordance with embodiments and a sample of 11 eye positions, which fall within the non-rectangular eye-box. Thus, the four eye positions from the sample of 15 eye positions at the corners of the rectangular eye-box area of FIGS. 9 and 10A and 9 and 10B are omitted from the measurements. As can be seen in FIGS. 9C and 10C, as with FIGS. 9A and 10A, horizontal and vertical disparity is a minimum at the centre point of the eye-box—that is when the eye is positioned at the centre of the eye-box. Horizontal and vertical disparity increases when the eye moves both horizontally or vertically from the centre point. Vertical disparity increases more the further away the eye position moves in the vertical direction from the horizontal midline, and horizontal disparity increases more the further away the eye position moves in the horizontal direction from the vertical midline. However, the amount of horizontal and vertical disparity further reduced at the eye positions away from the centre point compared to FIGS. 9A and 9B and 10A and 10B, as denoted by the reduced size of the circles. Note that the vertical disparity and horizontal disparity remain substantially the same at the centre point. Accordingly, the results show reduced binocular disparity, and this improved image quality, at all eye positions within the non-rectangular eye-box of the present disclosure.

FIG. 11 shows a table of the percentage reduction in the measured distortion, vertical disparity and horizontal disparity, for each of the second and third configurations (configurations "B" and "C") in comparison to the first configuration (configuration A). In particular, the percentage reduction is shown for both the average and maximum measured values for distortion, vertical disparity and horizontal disparity.

HUD Volume Reduction Results

Figure 12:
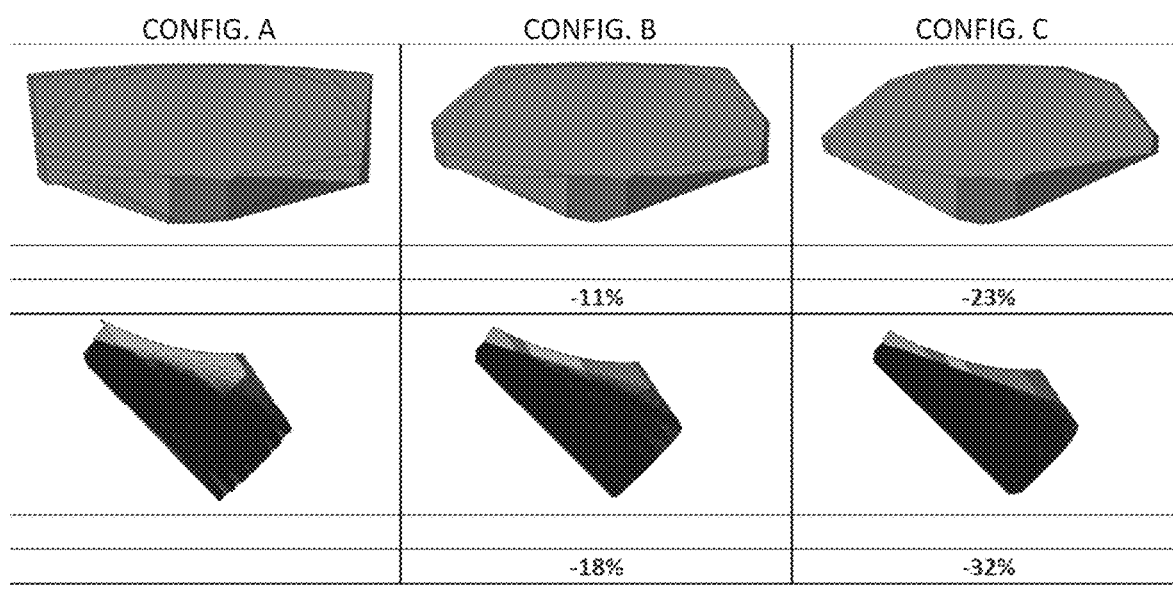
FIG. 12 shows the results of some HUD volume optimisation work possible owing to the concepts disclosed herein.

FIG. 12 shows the results of HUD volume optimisation work in accordance with the first to third configurations of the earlier figures. The shapes shown are optimised (specifically, minimised) volumes in which an optical relay system comprising the at least one optical component may be fitted in accordance the first to third configurations and cropped optical components of FIGS. 6A to 6C, respectively. The volume required by the second configuration may be up to 11% less than that of first configuration. The volume required by the third configuration may be up to 23% less than that of the first configuration owing to the cropped eye-box and therefore cropped optical component. The second row of 3D shapes show the required volumes after additional optimisation work in which a cover glass of the HUD was repositioned in a more compact arrangement permitted by cropping of the optical element. In the further improvement, the volume of the second configuration is 18% less than that of the first configuration and the volume of the third configuration is 32% less than that of the first configuration. These results illustrate the huge savings in HUD volume achievable in accordance with the cropped eye-box of the present disclosure.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A head-up display arranged to form virtual images viewable from an eye-box area, wherein the head-up display comprises:
    a picture generating unit comprising an array of pixels arranged to form a substantially quadrilateral display area, wherein the picture generating unit is arranged to display picture content in a sub-region of the quadrilateral display area;
    an optical relay system arranged to relay light from the sub-region of the quadrilateral display area to an eye-box area of the head-up display such that a virtual image of the picture content within the sub-region is visible therefrom, wherein the optical relay system comprises at least one optical component shaped in correspondence with the shape of the sub-region,
    wherein the shape of the eye-box area is non-rectangular.

2. The head-up display as claimed in claim 1 wherein the eye-box area comprises a substantially quadrilateral core shape and at least one cropped corner.

3. The head-up display as claimed in claim 2 wherein the quadrilateral core shape is a rectangle, optionally, wherein the long dimension of the rectangle is substantially horizontal during normal usage.

4. The head-up display as claimed in claim 2 wherein the at least one cropped corner comprises two or four cropped corners.

5. The head-up display as claimed in claim 4 wherein the two or four cropped corners are equal in size in at least one dimension, optionally, equal in size in two perpendicular dimensions.

6. The head-up display as claimed in claim 4 wherein each cropped corner has a size in a first dimension of 15% to 45% the maximum size of the eye-box area in the first dimension.

7. The head-up display as claimed in claim 1 wherein the eye-box area has an octagonal shape or diamond shape.

8. The head-up display as claimed in claim 1 wherein the eye-box area has a shape comprising at least five straight sides, optionally, at least six straight sides such as eight straight sides.

9. The head-up display as claimed in claim 1 wherein the eye-box area has a substantially elliptical shape.

10. The head-up display as claimed in claim 1 wherein the sub-region of the quadrilateral display area comprises a quadrilateral core shape and at least one cropped corner, optionally, two or four cropped corners.

11. The head-up display as claimed in claim 1 wherein the sub-region of the quadrilateral display area has a shape comprising at least five straight sides.

12. The head-up display as claimed in claim 1 wherein the quadrilateral display area is the array of pixels or corresponds to the array of pixels.

13. The head-up display as claimed claim 1 wherein the quadrilateral display area is a holographic replay field spatially separated from a display device comprising the array of pixels.

14. The head-up display as claimed in claim 13 wherein the display device is arranged to display a hologram of the picture content.

15. The head-up display as claimed in claim 1 wherein the picture generating unit comprises a holographic projector.

16. The head-up display as claimed in claim 1 wherein the picture generating unit comprises at least one of a backlit liquid crystal display, a laser scanning display, a digital micro-mirror device, a fluorescent display, and a plasma display.

17. A head-up display arranged to form a virtual image viewable from an eye-box area, wherein the head-up display is arranged to receive picture content within a sub-region of a substantially quadrilateral display area, wherein the head-up display further comprises:
    an optical relay system arranged to relay the received picture content to an eye-box area of the head-up display such that a virtual image of the picture content is visible therefrom, wherein the optical relay system comprises at least one optical component shaped in correspondence with the shape of the sub-region,
    wherein the shape of the eye-box area is non-rectangular.

18. A method of forming virtual images viewable from an eye-box area, the method comprising:
    forming a substantially quadrilateral display area, by way of a picture generating unit comprising an array of pixels, wherein the picture generating unit is arranged to display picture content in a sub-region of the quadrilateral display area; and
    relaying light from the sub-region of the quadrilateral display area to an eye-box area of the head-up display, by way of an optical relay system, such that a virtual image of the picture content within the sub-region is visible therefrom, wherein the optical relay system comprises at least one optical component shaped in correspondence with the shape of the sub-region,
    wherein the shape of the eye-box area is non-rectangular.

* * * * *